US007046349B2

(12) United States Patent
Everall et al.

(10) Patent No.: US 7,046,349 B2
(45) Date of Patent: May 16, 2006

(54) OPTICAL INTERROGATION SYSTEM AND SENSOR SYSTEM

(75) Inventors: Lorna Anne Everall, Birmingham (GB); Glynn David Lloyd, Birmingham (GB)

(73) Assignee: Aston Photonic Technologies Limited, Southampton (GB)

( * ) Notice: Subject to any disclaimer, the term of this patent is extended or adjusted under 35 U.S.C. 154(b) by 25 days.

(21) Appl. No.: 10/665,840

(22) Filed: Sep. 19, 2003

(65) Prior Publication Data
US 2004/0113056 A1 Jun. 17, 2004

(30) Foreign Application Priority Data
Dec. 16, 2002 (EP) .................................. 02258640

(51) Int. Cl.
*G01N 21/00* (2006.01)
(52) U.S. Cl. ..................................... 356/73.1
(58) Field of Classification Search ............... 356/73.1, 356/35.5, 477, 478; 385/12, 37; 250/227.18–227.23
See application file for complete search history.

(56) References Cited

U.S. PATENT DOCUMENTS

| | | | | |
|---|---|---|---|---|
| 6,571,027 B1 * | 5/2003 | Cooper et al. | ................. | 385/12 |
| 2001/0013934 A1 | 8/2001 | Varnham et al. | | |
| 2002/0025097 A1 | 2/2002 | Cooper et al. | | |

OTHER PUBLICATIONS

Stubkjaer, K.E., Recent advances in semiconductor optical amplifiers and their applications, *Proceedings of the International Conference on Indium Phosphide and Related Materials*, Newport, Apr. 21-24, 1992, New York I.EEE, U.S., vol. Conf. 4, Apr. 21, 1992, pp. 242-245.

Volanthen, M., "Low Coherence Technique to Charactrise Reflectivity and Time Delay as a Functin of Wavelength Within a Long Fibre Grating," *Electronics Letters, IEE Stevenage, GB*, vol. 32, No. 8, Apr. 11, 1996, pp. 757-758.

(Continued)

*Primary Examiner*—Tu T. Nguyen
(74) *Attorney, Agent, or Firm*—Kenyon & Kenyon LLP

(57) ABSTRACT

An optical interrogation system 10 includes optical amplifying and gating apparatus, in the form of a semiconductor optical amplifier (SOA) 14 and an optical source 12, 14. Drive apparatus 22 (an electrical pulse generator driven by a variable frequency oscillator) is provided to generate electrical drive pulses (see inset (a)) which are applied to the SOA 14, to cause the SOA 14 to switch on and off. The optical source comprises a super-luminescent diode (SLD) 12, the CW output from which is gated into optical pulses by the SOA 14. The SOA 14 is optically coupled to the waveguide 16 containing an array of reflective optical elements (gratings G) to be interrogated. The interrogation system further includes an optical detector 18, optically coupled to the SOA 14, operable to evaluate the wavelength of a returned optical pulse transmitted by the SOA 14.

20 Claims, 17 Drawing Sheets

OTHER PUBLICATIONS

Cooper, D.J.F., "A High-Sensitivity, Simple, Low-Cost Method for the Measurement of Time-Multiplexed Fiber Bragg Grating Sensors," *Proc. LEOS* 2001, pp. 867-868.

Cooper, D.J.F., "Time-division Multiplexing of Large Serial Fiber-Optic Bragg Grating Sensor Arrays," *Applied Optics*, vol. 40, No. 16, Jun. 1, 2001, pp. 2643-2654.

Smith, P., "Serial Multiple Bragg FOS Strain Measuring System," extract from Project T2.4 a report for the year 2001/2003 of ISIS (Intelligent Sensing for Innovate Structures ) Canada Research Network, publication date unknown.

* cited by examiner

OPTICAL INTERROGATION SYSTEM AND SENSOR SYSTEM

BACKGROUND OF THE INVENTION

The invention relates to an optical interrogation system and to an optical sensor system incorporating the optical interrogation system.

DESCRIPTION OF THE RELATED ART

The two most widely used methods of interrogating gratings within a multi-grating array are wavelength division multiplexing (WDM) and time division multiplexing (TDM). In the case of WDM based systems, each grating within the array is fabricated to have a different resonant wavelength, located within a different wavelength window. A continuous wave broad bandwidth optical source is used to illuminate all of the gratings simultaneously, and the resulting reflected signal from each grating is simultaneously present in the output spectrum presented to a wavelength measuring system. The wavelength measuring system must therefore be able to measure multiple wavelengths simultaneously. This is an inherent feature of a scanning instrument such as an optical spectrum analyser, but presents a problem for instruments like wave-meters. Another disadvantage of WDM based systems is that as the number of gratings in the array increases so does the required operating bandwidth of the optical source and the wavelength measuring system.

In contrast, TDM based systems usually allow all of the gratings within the array to be located within the same wavelength window, with the gratings being illuminated by a pulsed optical source. In the simplest TDM based system a single short broad bandwidth pulse launched into one end of a fibre will reach a particular grating in the array at a particular moment in time. The grating will reflect part of the optical pulse, and the reflected signal will propagate back down the fibre towards the optical source and a wavelength measurement system. Pulses reflected from other gratings within the array will arrive at the measurement system at different times, since they will have travelled different distances. Differentiation of the absolute wavelength of each grating utilises the fact that light travels in a fibre at a calculable velocity of around 200,000,000 meters per second. The difficulty in operating this type of TDM based system is that it requires a wavelength measuring system that can operate at high speed. This is because the wavelength of each reflected pulse must be determined before the next pulse arrives. Due to the velocity of light and typical grating spacing, the reflected pulses are typically only nanoseconds apart.

An alternative TDM technique, which does not rely on high-speed wavelength determination, utilises short optical pulses of a single known wavelength. Only gratings within the array whose resonant wavelength matches that of the pulse will reflect the pulse. By changing the wavelength of the optical signal between pulses the full spectrum of the grating array may be scanned and wavelength of each of the gratings determined. The difficulty with this TDM technique is that it requires high-speed photodiodes to detect the reflected pulses and high-speed signal processing electronics. The need to have a scanning optical source, such as a tuneable laser diode or a broadband light source and scanning filter, is also a problem since these devices are often bulky and expensive.

A problem faced by all of these grating interrogation systems is that it is difficult to obtain high-power broad bandwidth optical sources. Since a broad bandwidth source by its very nature covers a large range of wavelengths, the power at any one wavelength is usually very low (typically −30 dB/nm). In a TDM based system, this problem is compounded by the fact that only short pulses with long inter-pulse delays are received at the measurement system, resulting in a further (often profound) reduction in the average optical power received by the measurement system.

In order to maximise the available power it is therefore necessary to ensure that the reflectivity of the gratings within the array is quite large. Increasing grating reflectivity increases the available signal at the measurement system, but has the disadvantage of limiting the total number of gratings that can be present within the array. This is because for every grating in the array that the incident pulse has to pass through, some of its power is lost as it is reflected back from the grating. The more gratings the pulse passes through, the more power it loses. In addition, the reflected light from a grating, which propagates back towards the measurement system, will also experience decay in power due to further reflections from other gratings between itself and the measurement system.

For gratings of 10% or higher reflectivity the rate of reduction in power can be dramatic. This can limit the total number of gratings within an array to around 5 to 10, and can mean that the measurement system must be able to cope with a broad range of input optical power levels. An additional disadvantage of using high reflectivity gratings within a TDM based sensor system is that significant interference can occur due to multiple reflections of the illuminating optical pulses.

A second type of optical interrogation system is the optical time domain reflectometer (OTDR). In an OTDR a light source (light emitting diode or laser diode) is turned on for a short time, to generate an outgoing optical pulse. The light travels along, for example, a piece of optical fibre under test and is reflected from any reflection points within the fibre. The reflection points are generally breaks in the fibre or optical components, such as patchcord connectors. Reflections may also arise due to general fibre backscatter. The reflected signals are recorded as a series of pulses at a detector. The timing of the reflected pulses relative to the outbound optical pulse determines the position of the break or component along the fibre. The magnitude of the reflected optical signal depends upon the type of reflection point. For example, a reflection from a flat patchcord connector would be around 4%, while the amount of reflection from a broken fibre would be less than this.

The main problem with existing OTDR technology is that it requires very fast signal processing electronics in order to distinguish the arrival times of different reflected pulses. The use of fast electronics means that the measurement accuracy of the magnitude of reflected pulses is low. In addition, the reflected optical signals are generally of low optical power, resulting in poor signal-to-noise ratios.

SUMMARY OF THE INVENTION

According to a first aspect of the invention there is provided an optical interrogation system comprising:

an optical source operable to generate optical pulses, to be coupled into one end of an optical waveguide, the waveguide being optically coupled at its other end to one or more reflective optical elements to be interrogated;

optical amplifying and gating means to be optically coupled to the waveguide and being operable to selectively transmit an optical pulse returned from a reflective optical element under interrogation, and being further operable to optically amplify an optical signal transmitted therethrough; and optical detection means optically coupled to the optical amplifying and gating means, and being operable to detect a returned optical pulse transmitted by the optical amplifying and gating means.

The optical amplifying and gating means is preferably an optical amplifying device capable of switched operation; when switched on the optical amplifying and gating means transmits and amplifies an optical signal, and when switched off the transmission and amplification of optical signals is prevented. The optical amplifying and gating means is preferably bi-directionally operable, and most preferably comprises a semiconductor optical amplifier, which may be gain clamped. The interrogation system preferably further comprises drive apparatus for the optical amplifying and gating means, the drive apparatus being operable to cause the optical amplifying and gating means to switch on and off.

The drive apparatus is preferably operable to generate electrical drive pulses of variable frequency and duration. The drive apparatus may generate pairs of electrical drive pulses. The drive apparatus may alternatively generate a stream of pairs of electrical drive pulses. The drive apparatus may further alternatively generate a continuous stream of electrical drive pulses, at a selected frequency and each having the same duration. The duration of an electrical drive pulse is preferably shorter than twice the time required for an optical signal to travel between closest adjacent reflective optical elements.

The drive apparatus may comprise an electrical pulse generator triggered by a variable frequency oscillator, or may alternatively comprise digitally programmable electrical pulse generating apparatus.

A plurality of optical amplifying and gating means may be provided, each to be optically coupled to a respective optical waveguide containing one or more reflective optical elements to be interrogated. Preferably, each of the optical amplifying and gating means are controlled by a single drive apparatus, the drive apparatus being selectively connectable to the respective optical amplifying and gating means of the optical waveguide containing a selected reflective optical element to be interrogated.

The optical source preferably comprises the optical amplifying and gating means, wherein when the optical amplifying and gating means is switched on it simultaneously generates an optical signal, in the form of amplified spontaneous emission, and gates the optical signal into an optical pulse. The optical source may additionally comprise an optical filter provided between the optical amplifying and gating means and the optical waveguide.

The optical source may alternatively comprise a continuous wave optical source operable to generate a continuous wave optical signal, coupled to the optical amplifying and gating means, wherein as the optical amplifying and gating means is switched on and off it gates the continuous wave optical signal into optical pulses. The continuous wave optical source may be a super-luminescent optical diode. The optical source may additionally comprise an optical filter provided between the continuous wave optical source and the optical amplifying and gating means, or between the optical amplifying and gating means and the optical waveguide.

The optical source may further alternatively comprise a pulsed optical source operable to generate optical pulses. The optical source may additionally comprise an optical filter provided after the pulsed optical source. The interrogation system preferably further comprises optical coupling means for coupling the optical pulses into the optical waveguide. The optical coupling means may comprise an optical waveguide routing device, such as an optical waveguide coupler, or may alternatively comprise an optical switching device.

The optical filter preferably has a transmission profile which substantially matches the spectral range occupied by the one or more reflective optical elements to be interrogated, the optical filter thereby acting to wavelength limit the optical bandwidth of the pulses.

Where the reflective optical elements to be interrogated are coupled to two or more different optical waveguides, an optical source may be provided for each optical waveguide. Alternatively, a single optical source may be used, the optical source being coupled to the optical waveguides via an optical routing element, such as an optical waveguide coupler or an optical switch.

The optical detection means may comprise a photodetector. The optical detection means may alternatively comprise wavelength evaluation apparatus optically coupled to the optical amplifying and gating means, and being operable to evaluate the wavelength of a returned optical pulse transmitted by the optical amplifying and gating means.

The wavelength evaluation apparatus may comprise an optical filter element having a wavelength dependent filter response followed by optical detection means, such as a photodetector, the electrical output from the optical detection means being processed by signal processing means operable to determine the wavelength of a detected optical signal; the gating of the optical amplifying and gating means identifying which grating it was returned from and the optical power of the filtered optical signal identifying its wavelength. The optical filter element may comprise a bulk optic optical filter. The optical filter may alternatively comprise an optical waveguide grating, such as a chirped Bragg grating having a reflectivity which varies substantially linearly with wavelength across the spectral profile of the grating, or a tilted optical waveguide grating having a coupling coefficient which varies with wavelength across the spectral profile of the grating.

The wavelength evaluation apparatus may alternatively comprise a wavemeter or an optical spectrum analyser; the gating of the optical amplifying and gating means identifying which reflective optical element an optical signal was returned from and the wavemeter or optical spectrum analyser measuring the wavelength of the optical signal.

The interrogation system may further comprise a section of optical waveguide coupled between an optical amplifying and gating means and its respective optical waveguide containing one or more reflective optical elements to be interrogated.

The interrogation system may alternatively or additionally further comprise optical signal routing means configured to route an optical pulse returned from a reflective optical element being interrogated back through the optical amplifying and gating means, in the direction towards the reflective optical element under interrogation.

The presence of the optical signal routing means causes an optical pulse that has been reflected from a reflective optical element being interrogated to be reflected back through the optical amplifying and gating means, back into the optical waveguide and back to the reflective optical element being interrogated, where it is again reflected, and so on. In this way the optical pulse experiences multiple amplifications as it cycles back and forth from the reflective optical element under interrogation, passing through the optical amplifying and gating means each time.

The optical signal routing means preferably comprises an optical reflector provided after the optical amplifying and gating means, the reflector being located sufficiently close to the optical amplifying and gating means to ensure that the time it takes an optical signal to propagate from the optical amplifying and gating means to the reflector and back to the optical amplifying and gating means is shorter than the duration of the electrical drive pulse switching the optical amplifying and gating means on.

The spectral profile in reflection of the optical reflector preferably covers the same spectral range as that occupied by the one or more reflective optical element to be interrogated. The optical reflector may have a reflectivity of less than 100 percent, thereby transmitting part of the optical signal which is then routed to the wavelength evaluation apparatus. The optical reflector may be coupled to an optical signal tapping element, such as an optical waveguide coupler, thereby enabling the optical reflector to have a reflectivity of up to 100 percent, part of the optical signal reflected from the optical reflector being tapped off and routed to the wavelength evaluation apparatus.

The interrogation system may alternatively further comprise a series of optical reflectors provided after the optical amplifying and gating means, each reflector being located at a different distance from the optical amplifying and gating means, the most distant reflector being located sufficiently close to the optical amplifying and gating means to ensure that the time it takes an optical signal to propagate from the optical amplifying and gating means to the most distant reflector and back to the optical amplifying and gating means is shorter than the duration of the electrical drive pulse switching the optical amplifying and gating means on. The spectral profile in reflection of each optical reflector preferably covers a different spectral range.

The or each optical reflector is preferably an optical waveguide grating, and is most preferably a Bragg grating.

The optical signal routing means may alternatively comprise a second optical waveguide, extending between, and optically coupled to, the optical waveguide coupled to the one or more reflective optical elements and the optical amplifying and gating means, such that optical pulses travel through the optical amplifying and gating means in one direction only, being towards the one or more reflective optical elements.

The interrogation system may additionally comprise an optical filter provided in front of (as seen by an optical signal) the wavelength evaluation apparatus, the optical filter having a transmission profile which substantially matches the spectral range occupied by the one or more reflective optical elements to be interrogated, the optical filter thereby acting to substantially remove any part of a returned optical signal at wavelengths outside the spectral range of the one ore more reflective optical elements.

The or each optical waveguide may be an optical fibre or a planar optical waveguide.

According to a second aspect of the invention there is provided an optical sensor system comprising:
an optical waveguide coupled at one end to one or more reflective optical elements;
the optical waveguide being coupled at its other end to an optical interrogation system according to the first aspect of the invention.

The optical sensor system preferably comprises an optical waveguide coupled to a spaced array of optical waveguide gratings. The resonant wavelength of each grating within the array preferably lies within the same wavelength window, all of the gratings thereby operating within a single optical channel.

Alternatively, the gratings within the array may be arranged in groups, each group containing a substantially identical set of gratings, the resonant wavelength of each grating within a group lying within a different wavelength window, and thus operating within a different optical channel, such that the time of flight of a returned optical pulse identifies which group a grating being interrogated belongs to.

The sensor system may comprise a plurality of optical waveguides each containing a spaced array of optical waveguide gratings, each waveguide being coupled to a respective optical amplifying and gating means.

The or each optical waveguide may be an optical fibre or a planar optical waveguide. The array optical waveguide gratings are preferably Bragg gratings.

The or each reflective optical element may alternatively comprise a Fabry-Perot etalon device, which may be a bulk optic Fabry-Perot etalon, an optical fibre Fabry-Perot etalon, or an optical waveguide grating based Fabry-Perot etalon. The or each reflective optical element may further alternatively comprise an end of an optical fibre, which may be a mirrored end, the end of an optical fibre patch-cord, a break within a section of optical fibre, a crystal based reflective optical element, or a mirror element.

BRIEF DESCRIPTION OF THE DRAWINGS

Specific embodiments of the invention will now be described in detail, by way of example only, with reference to the accompanying drawings, in which.

DETAILED DESCRIPTION OF EMBODIMENTS

Figure 1A:
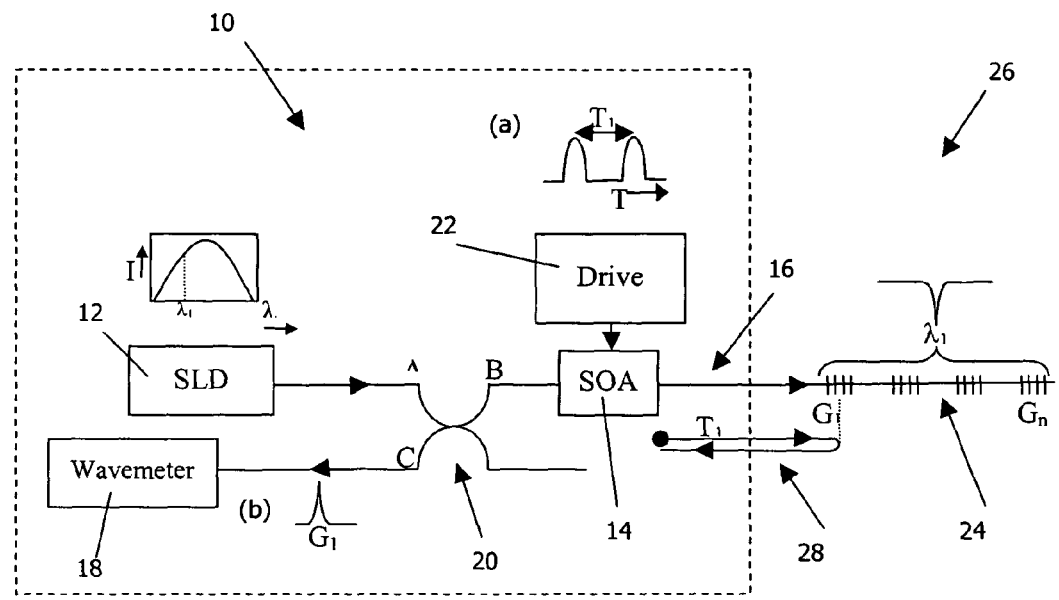
FIG. 1(a) is a diagrammatic representation of an optical interrogation system according to a first embodiment of the invention and an optical sensor system according to a second embodiment of the invention.

A first embodiment of the invention provides an optical interrogation system 10, as shown in FIG. 1(a). The interrogation system 10 comprises an optical source 12, 14 operable to generate optical pulses, to be coupled into an optical waveguide 16 containing reflective optical elements, in this example gratings G, to be interrogated. The interrogation system 10 further comprises optical amplifying and gating means, which in this example takes the form of a bi-directionally operable semiconductor optical amplifier (SOA) 14. The SOA 14 is optically coupled to the waveguide 16 containing the gratings G to be interrogated. The interrogation system 10 also comprises optical detection means, which in this example takes the form of a wavemeter 18 optically coupled to the SOA 14. The wavemeter 18 is operable to evaluate the wavelength of a returned optical pulse transmitted by the SOA 14.

In this example, the optical source comprises a continuous wave (CW) optical source, in the form of a super-luminescent diode (SLD) 12, which is gated into optical pulses by the SOA 14. The output of the SLD 12 is coupled via ports A and B of a signal splitting device, which in this example is an optical fibre coupler 20, but could alternatively be a circulator, to the SOA 14.

The interrogation system 10 further comprises drive means 22 operable to cause the SOA 14 to switch on and off. SOAs are usually used entirely as amplifiers in single or multi-channel telecommunications networks, where they operated in a 'continuously-on' mode, being driven by a DC electrical drive signal. In this invention the SOA 14 is operated in a pulsed drive mode, and is required to operate with nanosecond switching times.

The drive means 22 generates electrical drive pulses (see inset (a)) which are applied to the SOA 14. In this example the drive means 22 comprises an electrical pulse generator triggered by a variable frequency oscillator (not shown). The variable frequency oscillator may be constructed using a direct digital synthesis (DDS), or frequency synthesizer integrated circuit, with the frequency selection performed digitally under the control of a microprocessor. The pulse generator may be constructed from an analogue or digital delay line, a simple RC timing circuit or logic gate delays.

Figure 1B:
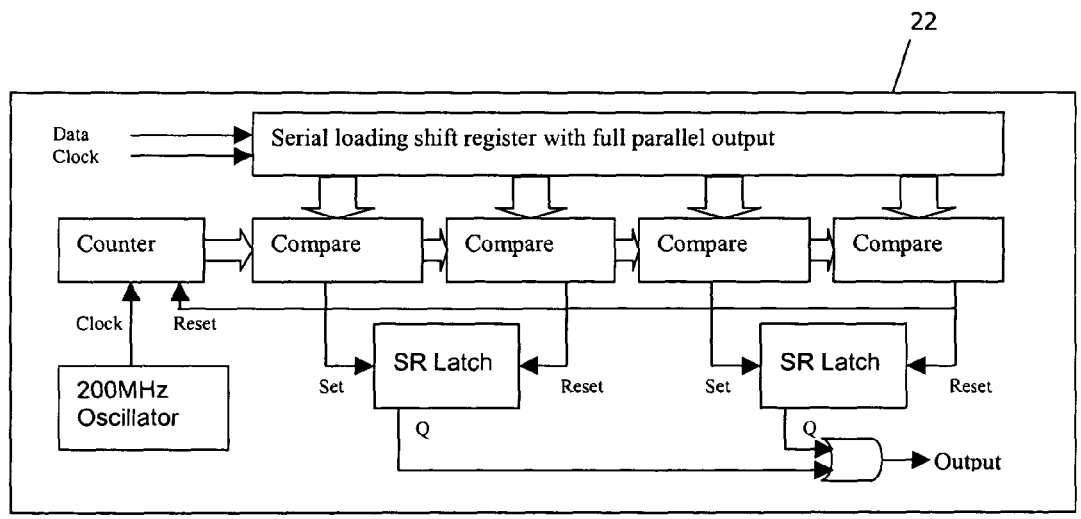
FIG. 1(b) is a schematic representation of a digitally programmable alternative drive means suitable for use in the interrogation system of FIG. 1(a)

The drive means 22 may alternatively comprise a single programmable device operable to digitally perform the functions of a variable frequency oscillator, delay generators and pulse generators. A suitable digitally programmable drive means 22 is shown in FIG. 1(b). The frequency, duration and delay between pulses can be controlled to quartz crystal accuracy. With a typical clock frequency of 200 MHz, timing resolutions of at least 5 ns are possible. More advanced designs employing multi-phased clocking will increase the timing resolution still further.

When an electrical drive pulse is applied to the SOA 14, the SOA 14 is switched on, allowing an incident optical signal to be transmitted and amplified by the SOA 14. When no electrical power is applied to the SOA 14, the SOA 14 is switched off and has a high optical absorption, thereby substantially preventing the transmission of an incident optical signal. The SOA 24 is thereby operable to selectively transmit an optical signal, in particular an optical pulse returned from a grating G under interrogation.

By applying a series of electrical drive pulses, in this example a series of pairs of drive pulses, to the SOA 14 the CW optical signal from the SLD 12 is thereby gated into a series of optical pulses. As the optical signal propagates through the SOA 14 it undergoes optical amplification. The approximate spatial length of an optical pulse (for standard monomode optical fibre waveguide) is selected to be ~0.2 meters per 1 ns.

To interrogate one or more reflective optical elements the interrogation system 10 is coupled to an optical waveguide containing one or more reflective optical elements to be interrogated. In this example, the interrogation system 10 is shown coupled to an optical fibre 16 including a sensing section 24 in which an array of fibre Bragg gratings ($G_1$ to $G_n$) are provided. The interrogation system 10 and the array of gratings together form an optical sensor system 26 according to a second embodiment of the invention, each of the gratings G within the array forming a sensing element. The resonant wavelengths of each of the gratings G are substantially the same in this example, each grating G therefore operating within the same optical channel. In this example the gratings G are 2.5 mm in length and have a resonant wavelength of 1550 nm, a spectral bandwidth of 0.2 nm and a transmission loss of 4%. The four gratings shown in FIG. 1(a) are intended to illustrate an array of up to n gratings, where n can be up to 1000.

The use of optical waveguide gratings, and in particular optical fibre Bragg gratings, as sensors will be well known to the person skilled in the art and so their operation and use will not be described in detail here.

In operation, the application of a first electrical drive pulse to the SOA 14 generates a first optical pulse, which is coupled into the fibre 16. As the optical pulse propagates along the fibre 16 it will meet each of the gratings G within the array in turn, and part of the pulse will be reflected by each grating. As long as the spatial length of the incident optical pulse is no longer than twice the minimum spatial distance between gratings in the array, the result will be a series of reflected optical pulses, each of similar length to the original optical pulse, but separated in time and space according to the difference in total propagation time of each of the reflected optical pulses from their respective gratings G. The reflected optical pulses propagating back towards the SOA 14 will consequently arrive at the SOA 14 at different times. The time of flight of each reflected optical pulse therefore identifies the grating from which it was reflected.

It will be appreciated by the skilled person that the CW optical source, SLD 12, could be replaced by a pulsed optical source. The timing of the electrical drive pulses to the SOA 14 would then be adjusted to allow selected ones of the optical pulses generated by the pulsed optical source to be launched into the optical fibre 16.

The selection of a particular reflective optical element, in this example a grating G, for interrogation is achieved by adjusting the time period T1 between the electrical drive pulses. The frequency of the electrical drive pulses is set such that the period T1 between the first and second pulses within each pair is equal to the time of flight of the optical pulse generated as a result of the first drive pulse from the SOA 14 to a selected grating, $G_1$ in FIG. 1(a), and back, as shown by arrow 28. The SOA 14 therefore receives a second electrical drive pulse from the drive means 22 as the reflected optical pulse (from grating $G_1$) arrives back at the SOA 14. As a result, the SOA 14 is switched on as the reflected pulse arrives, allowing the reflected pulse to be transmitted through the SOA 14, the reflected pulse being amplified at the same time. Any reflected optical pulse which arrives before or after the SOA 14 is switched on, i.e. from another grating within the array, will be absorbed, and thus will not be transmitted. The duration of the optical pulses is selected to be shorter than twice the time of flight of an optical pulse between closest adjacent gratings within the array.

The gated reflected optical pulse is then routed from the SOA 14 to the wavemeter 18, via ports B and C of the coupler 20, where the wavelength of the reflected optical pulse, and thus the wavelength of the interrogated grating $G_1$, is measured and recorded.

The application of the second electrical drive pulse to the SOA 14 has another effect, in addition to the gating of the reflected optical pulse: a second optical pulse is generated and coupled into the optical fibre 16.

Where only two electrical drive pulses are used to drive the SOA 14, as described above, only one reflected optical pulse will arrive back at the wavelength measurement system. This alone can be useful, but would require a fast wavelength measuring system that could take a measurement from a single pulse. Alternatively, a series of pairs of electrical drive pulses may be used. Sufficient time must be allowed between pairs of drive pulses to allow the second optical pulse generated by the second electrical drive pulse to the SOA 14 to be reflected by the gratings and absorbed by the SOA 14, thereby removing it from the system and avoiding interference with subsequent optical pulses.

Figure 2:
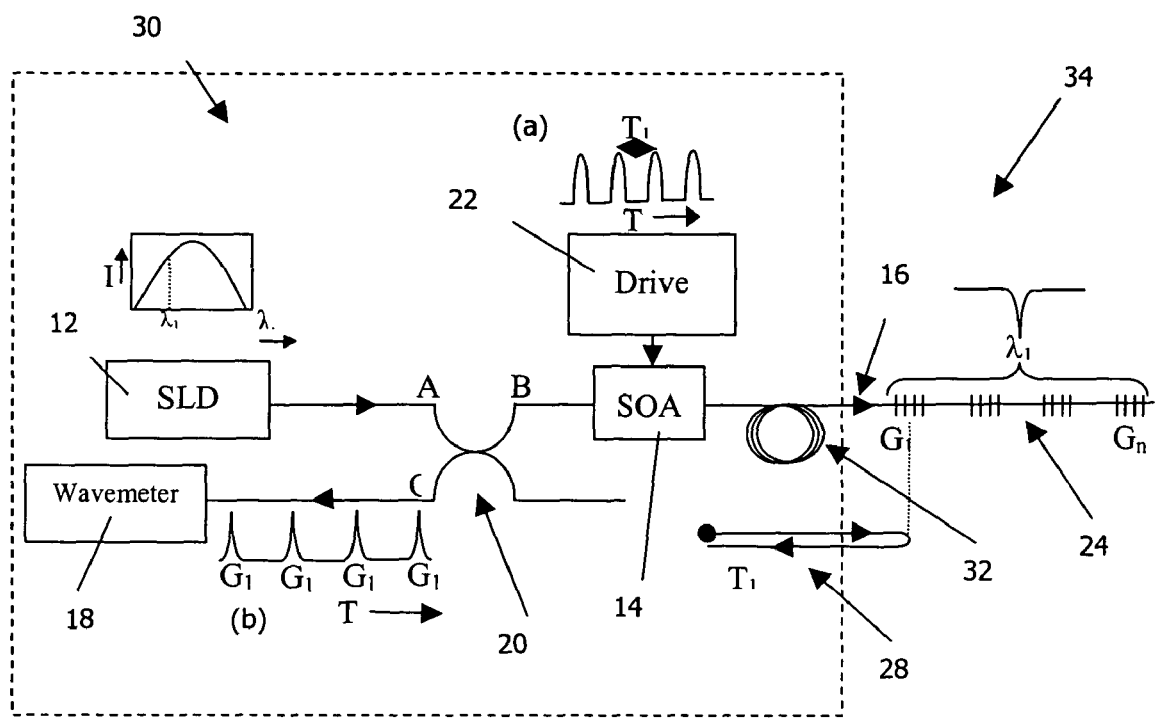
FIG. 2 is a diagrammatic representation of an optical interrogation system according to a third embodiment of the invention and an optical sensor system according to a fourth embodiment of the invention.

An optical interrogation system 30 according to a third embodiment of the invention is shown in FIG. 2. The interrogation system 30 is substantially the same as the interrogation system 10 according to the first embodiment of the invention, with the following modifications. The same reference numerals are retained for corresponding features.

In this example the drive means 22 is operable to generate a series of electrical drive pulses, as shown in inset (a). Each electrical drive pulse is of the same duration and the period between the pulses is constant. The duration of the electrical drive pulses is chosen to be no longer than twice the time required for an optical signal to propagate between closest adjacent reflective optical elements, gratings G, within the array. The frequency of the variable frequency oscillator, and thus the frequency of the electrical drive pulses, is changed in order to select a particular grating within the array for interrogation. The frequency of the variable frequency oscillator is chosen so that the period T1 between electrical drive pulses is equal to the time of flight of an optical pulse from the SOA 14 to the chosen grating ($G_1$ in this example) and back to the SOA 14. An approximate figure would be 10 ns for each meter of optical fibre between the SOA 14 and the selected grating (assuming standard optical fibre).

Under the control of the drive means 22, the SOA 14 is therefore switched on and off at regular intervals. Each time the SOA 14 is switched on an optical pulse is generated and launched into the optical fibre 16, at the same time gating the correct reflected optical pulse, which then propagates on to the wavemeter 18, as described above.

Figure 3:
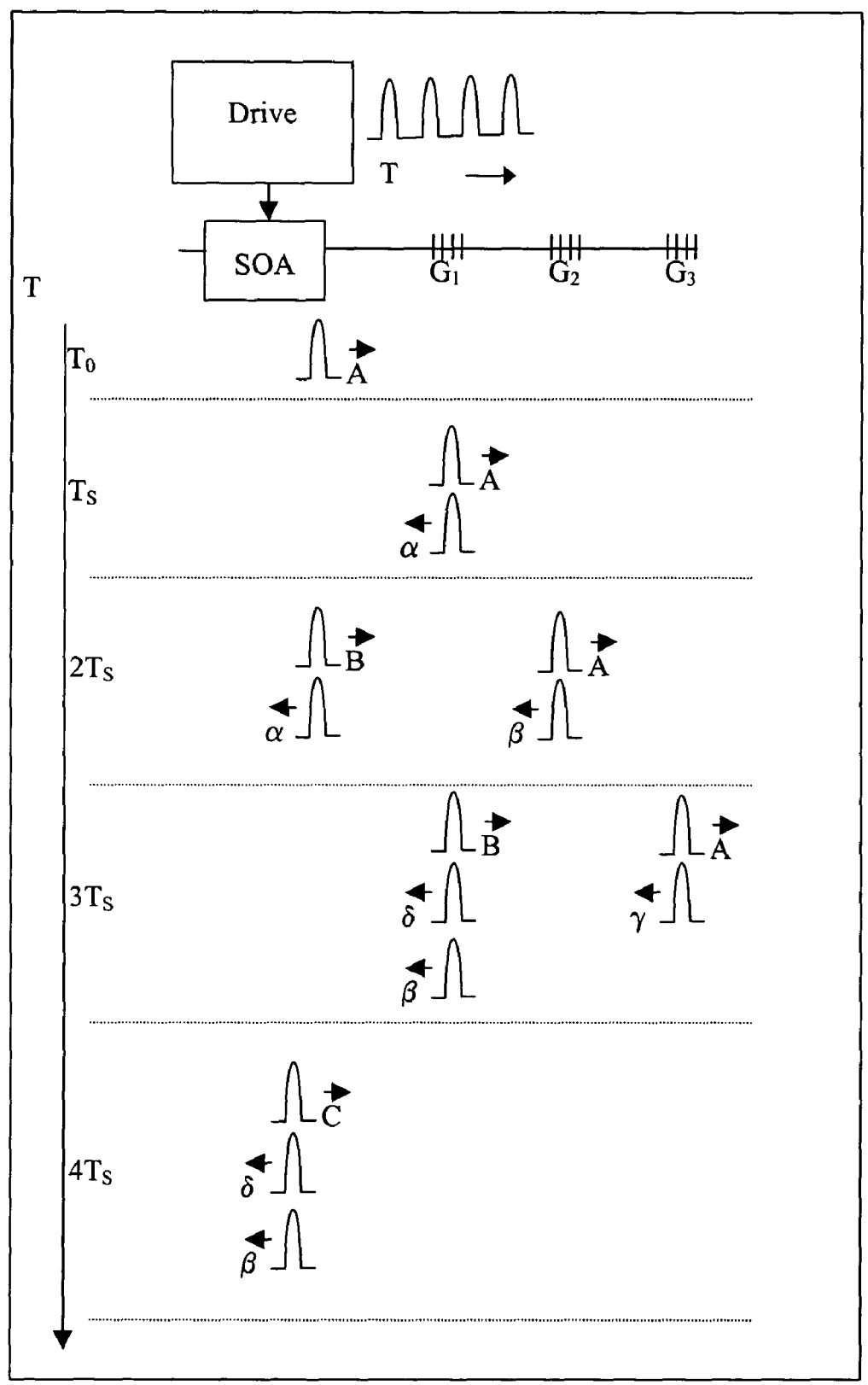
FIG. 3 is a diagrammatic illustration of the interference that occurs when multiple pulses propagate within an optical sensor system.

Of greater significance is the inclusion of an additional section of optical waveguide, in this example a length of optical fibre 32, after the SOA 14 i.e. in use, between the SOA 14 and the optical fibre 16 containing the reflective optical elements (gratings G) to be interrogated. This additional length of optical fibre 32 is included to remove the possibility of interference from simultaneous reception at the SOA 14 of reflected optical pulses from more than one grating G. To understand the reason for this, consider the situation shown in FIG. 3 when the additional fibre 32 is not present and the interrogation system 30 is coupled to an optical fibre containing an array of three gratings ($G_{1-3}$), spaced at 1 meter intervals from the SOA 14. If, for example, the interrogation system 30 was set to monitor the wavelength of the first grating $G_1$, located 1 meter from the SOA 14, the following events would occur.

At time $T_0$ a first electrical drive pulse is applied to the SOA 14 and an optical pulse A is generated and launched into the fibre 16, where it propagates towards the gratings G. At a time $T_s$ later (where $T_s \approx 5$ ns, being the time taken for an optical signal to travel 1 m in standard optical fibre), part of optical pulse A will be reflected off the first grating $G_1$ and this first reflected pulse α will propagate back towards the SOA 14. The remainder of the optical pulse A will continue towards the second and third gratings, $G_2$ and $G_3$.

At a time $2T_s$ a second electrical drive pulse is applied to the SOA 14, causing a second optical pulse B to be generated and launched into the fibre 16, where it too propagates towards the gratings G. At this same time the first reflected pulse α arrives back at the SOA 14. Since the SOA 14 is switched on (i.e. the gate is open and amplifying) it will be transmitted and amplified as described above. The first reflected pulse α will then propagate to the wavemeter, as intended. However, at this same time ($2T_s$) the remainder of the first optical pulse A will arrive at the second grating $G_2$, where part of it will be reflected, creating a second reflected pulse β.

At a time $3T_s$ the remainder of the first optical pulse A will arrive at the third grating $G_3$, where part of it will be reflected, creating a third reflected pulse γ. At this same time the second optical pulse B will arrive at the first grating $G_1$, where part of it will be reflected, creating a fourth reflected pulse δ. Simultaneously, the second reflected pulse β will arrive back at the first grating $G_1$. Part of the second reflected pulse β will be reflected by the first grating $G_1$, back towards the second grating $G_2$, whilst the remainder of the second reflected pulse β will be transmitted through the first grating $G_1$. The transmitted part of the second reflected pulse β will therefore propagate along with the fourth reflected pulse δ.

At a time $4T_s$ a third electrical drive pulse is applied to the SOA 14, causing a third optical pulse C to be generated and launched into the fibre 16. At this time the fourth reflected pulse δ (from the selected grating $G_1$) and the second reflected pulse β (from the second grating $G_2$ i.e. not from the selected grating) will both arrive at the SOA 14, where they will be transmitted and amplified. The result is that two reflected optical signals will arrive at the wavelength measurement apparatus. Interference will occur between the two reflected optical signals, making them largely indistinguishable from each other.

If the distance between the SOA 14 and the first grating $G_1$ is not longer than the distance between the first and last gratings in the array, this type of interference is likely to occur, the interference being most prominent when the gratings are evenly spaced. The inclusion of the additional length of fibre 32 between the SOA 14 and optical fibre 16 eliminates the most dominant form of this type of interference. The length of the additional fibre 32 must be longer than the distance between the first and last gratings within the grating array to be interrogated. There is still the possibility that 3-reflection interference may occur, but this can be ignored if grating reflectivity values are low, as discussed in more detail below.

As a result of the inclusion of the additional length of optical fibre 32, a series of reflected optical pulses (reflected from a selected grating) are received at the wavemeter, as shown in insert (b) in FIG. 2, one reflected pulse for each optical pulse generated and launched into the fibre 16.

If the additional length of optical fibre 32 is longer than the minimum length required it may be possible to increase the frequency of the electrical drive pulses, and thus of the optical pulses, to a multiple of the basic frequency. In this manner more than one optical pulse would be propagating within the optical fibre 16 at any one time. For example, to increase the frequency by a factor of two would require the length of the additional fibre 32 to be at least twice the distance between the first and last gratings in the array.

Providing the additional length of optical fibre 32 therefore ensures that for every optical pulse generated by the SOA 14, and launched into the optical fibre 16, one reflected optical pulse is delivered to the wavemeter.

The skilled person will understand that the use of an additional length of optical fibre is described here since the optical waveguide containing the array of gratings to be interrogated is an optical fibre. Where the optical waveguide containing the reflective optical elements to be interrogated is instead a planar optical waveguide, an additional section of planar optical waveguide may be used instead.

When the interrogation system 30 is coupled to the optical fibre 16 containing an array of gratings G to be interrogated, as described above, they together form an optical fibre grating sensor system 34 according to a fourth embodiment of the invention.

Figure 4:
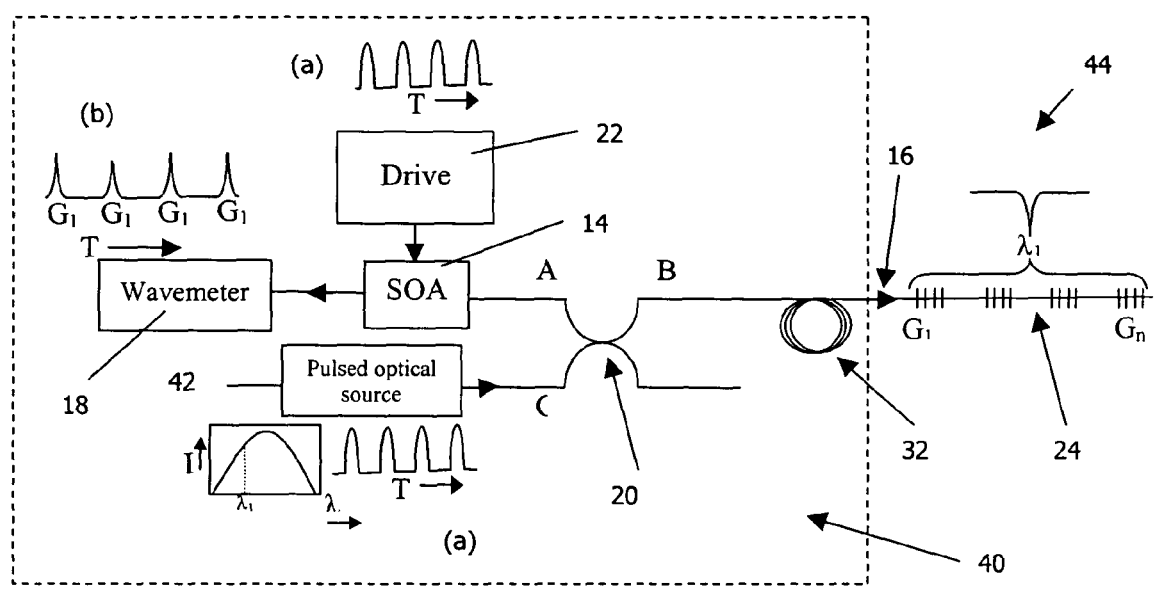
FIG. 4 is a diagrammatic representation of an optical interrogation system according to a fifth embodiment of the invention and an optical sensor system according to a sixth embodiment of the invention.

FIG. 4 shows an optical interrogation system 40 according to a fifth embodiment of the invention. The interrogation system 40 of this embodiment is substantially the same as the interrogation system 30 according to the third embodiment, with the following modification. The same reference numerals are retained for corresponding features.

In this example the CW optical source 12 of the third embodiment is replaced by a pulsed optical source 42 operable to generate optical pulses. In order to avoid the need for complicated timing arrangements to make the SOA 14 gate selected optical pulses from pulsed optical source into the optical fibre 16, the pulsed optical source is coupled to the optical fibre 16 between the SOA 14 and the additional length of fibre 32.

In operation, when coupled to an optical waveguide, such as optical fibre 16, including a sensing section 24 in which an array of gratings are provided, optical pulses generated by the pulsed optical source 42 are coupled into the additional optical fibre 32 via ports C and B of the optical coupler 20. The optical pulses then propagate along the additional optical fibre 32 and from there along the optical fibre 16, where they encounter and are reflected by one or more of the gratings G. The reflected optical pulses then propagate back along the fibres 16 and 32 to the SOA 14, via ports B and A of the coupler 20. As described above, the frequency of the electrical drive pulses applied from the drive means 22 to the SOA 14 is set to gate (and amplify) only those pulses reflected from a selected one of the gratings G within the array. The pulses transmitted through the SOA 14 are then routed to the wavelength measurement apparatus 18.

When coupled to one another the interrogation apparatus 40 and the array of reflective optical elements, in this example gratings, within the optical fibre 16 together form an optical sensor system 44 according to a sixth embodiment of the invention.

Figure 5:
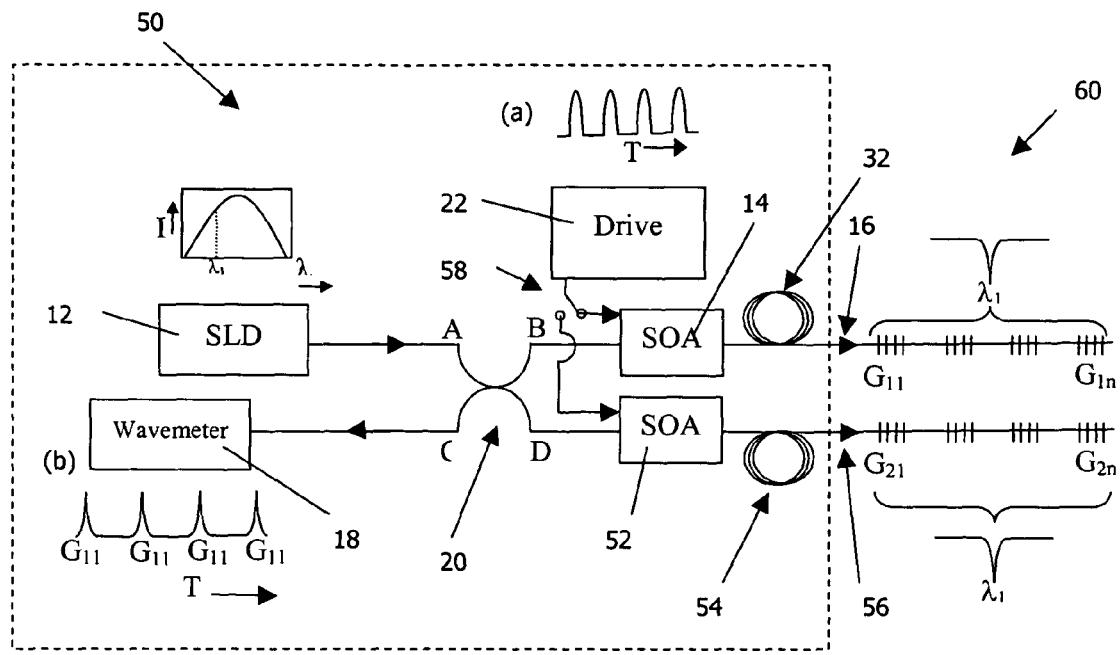
FIG. 5 is a diagrammatic representation of an optical interrogation system according to a seventh embodiment of the invention and an optical sensor system according to an eighth embodiment of the invention.

A seventh embodiment of the invention provides an optical interrogation system 50 as shown in FIG. 5. In this embodiment the interrogation system 50 further comprises a second SOA 52, and a second additional length of fibre 54. The second SOA 52 is coupled to the SLD 12 via ports A and D of the coupler 20.

The second SOA 52 is to be coupled, via the second additional fibre 54, to a second optical waveguide containing one or more reflective optical elements to be interrogated, in this example a second optical fibre 56 containing an array of fibre Bragg gratings ($G21$ to $G2n$).

The same drive means 22 (an electrical pulse generator triggered by a variable frequency oscillator, as before) is used to control both SOAs 14, 52. An electrical switch 56 is provided for selecting which SOA 14, 52 is to be driven at any specific time, thereby selecting which array of gratings is to be interrogated. Therefore only one wavelength measurement apparatus, such as a wavemeter 18, is required, since only one grating array will be selected at any one time.

This arrangement thus allows the gratings within more than one optical waveguide to be interrogated using a single drive means 22 and a single wavemeter 18. It will be appreciated that the described interrogation system 50 may be further expanded to interrogate gratings within more than two optical waveguides by providing additional SOAs, coupled to the SLD 12 and the wavemeter 18 via a more complex optical routing element.

The interrogation system 50 operates in the same manner as previously described once a particular SOA 14, 52 and its respective grating array has been selected by activation of the electrical switch 58.

The skilled person will appreciate that the SLD 12 and SOA 14, 52 combination optical pulse source may be replaced by a pulsed optical source, as shown in FIG. 4. The pulsed source would similarly be coupled to the optical fibres 16, 56 between the respective SOAs 14, 52 and additional lengths of fibre 32, 54. A single pulsed source may be coupled to the two fibres 16, 56 via the two output ports (B and D) of a single coupler, or two pulsed sourced may be coupled to their respective fibres 16, 56 via two separate couplers.

When the interrogation system 50 is coupled to the two optical fibres 16, 56, containing their respective arrays of gratings G1 to G1$n$ and G21 to G2$n$, the interrogation system 50 and the optical fibres 16, 56 together form an optical sensor system 60 according to an eighth embodiment of the invention.

Figure 6:
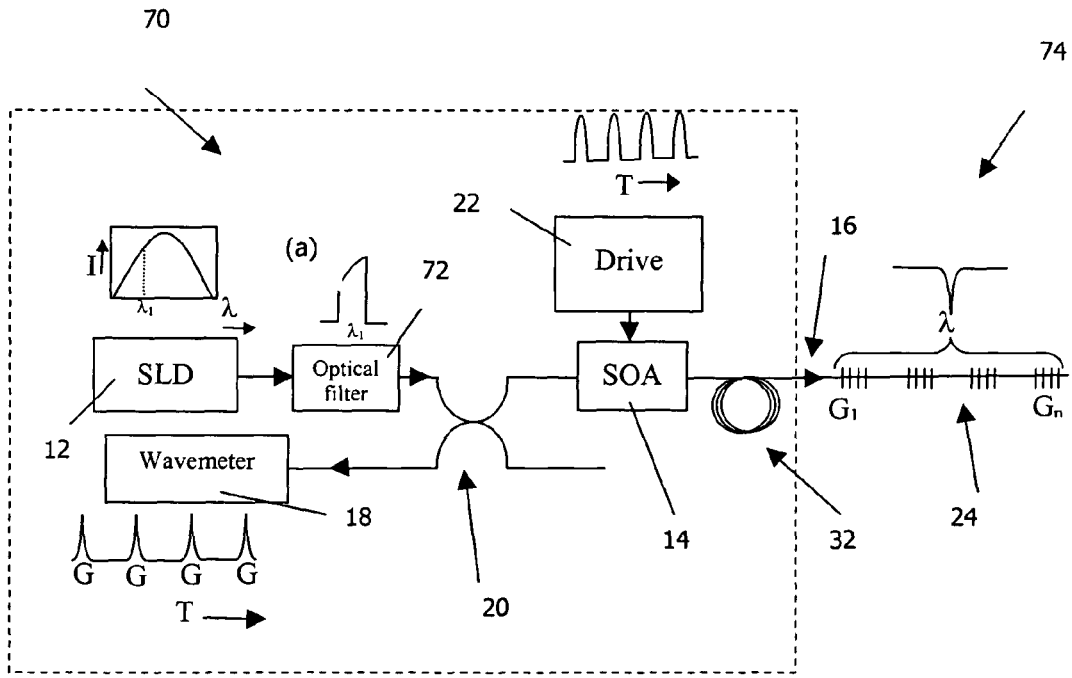
FIG. 6 is a diagrammatic representation of an optical interrogation system according to a ninth embodiment of the invention and an optical sensor system according to a tenth embodiment of the invention.

An optical interrogation system 70 according to a ninth embodiment of the invention is shown in FIG. 6. The interrogation system 70 of this embodiment is substantially the same as the interrogation system 30 shown in FIG. 2, with the following modification. The same reference numerals are retained for corresponding features.

In this example, an optical filter 72 is provided between the SLD 12 and the SOA 14. The filter 72 is included because SOAs have a finite maximum total optical power output. As a result, they can be used to amplify an optical signal containing a narrow range of wavelengths to a higher output level than one containing a broad band of wavelengths. The filter 72 has a filter function, shown in inset (a), having a spectral range corresponding to the operating range of the gratings G to be interrogated. As a result the bandwidth of the CW optical signal that reaches the SOA 14 only covers the maximum tuning range of the gratings G to be interrogated. All of the wavelengths within the CW optical signal generated by the SLD 12 which fall outside the operating range of the gratings G are blocked. This reduction in the bandwidth of the CW optical signal to be gated into pulses (and amplified) by the SOA 14 means that the SOA 14 can amplify the pulses to a higher average optical power level. The higher optical power of the pulses improves the performance of the interrogation system 70, specifically the signal to noise ratio at the wavelength measurement apparatus, and enables the interrogation system 70 to be used to interrogate lower reflectivity gratings.

When the interrogation system 70 is coupled to the optical fibre 16 containing the array of gratings G to be interrogated, they together form an optical sensor system 74 according to a tenth embodiment of the invention.

Figure 7:
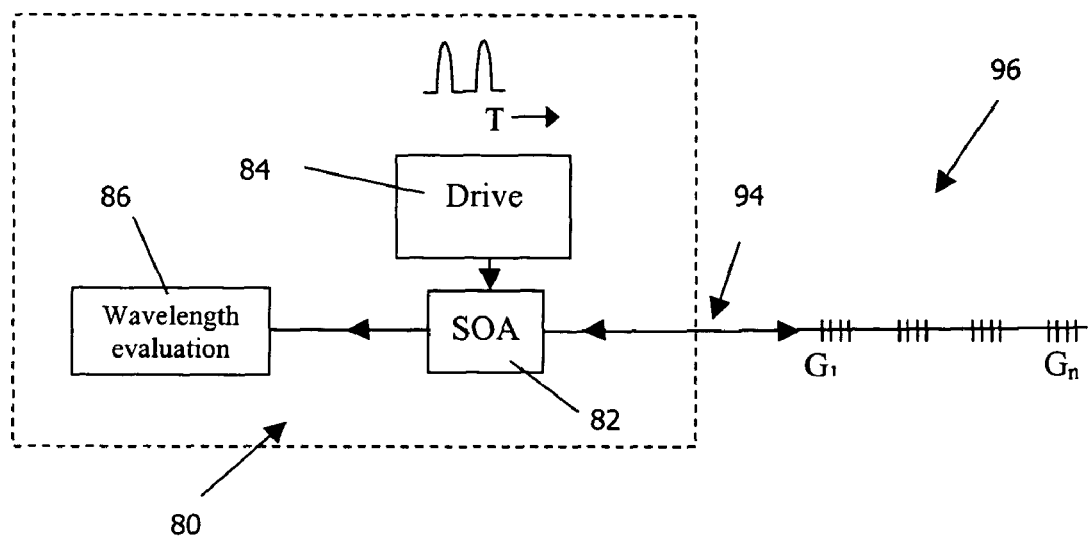
FIG. 7 is a diagrammatic representation of an optical interrogation system according to an eleventh embodiment of the invention and an optical sensor system according to a twelfth embodiment of the invention.

FIG. 7 shows an optical waveguide interrogation system 80 according to an eleventh embodiment of the invention.

The interrogation system 80 comprises optical amplifying and gating means in the form of an SOA 82, the SOA 82 being controlled by drive means 84, which is substantially the same as the drive means 22 of FIGS. 1($a$) and 1($b$), and wavelength evaluation apparatus 86.

In this example, the SOA 82 acts as an optical source in addition to it being a bi-directionally operable optical amplifying and gating device. When the SOA 82 receives an electrical drive pulse it simultaneously generates an optical signal, in the form of amplified spontaneous emission, and gates the optical signal into an optical pulse. As a result it is possible to remove the CW broad bandwidth optical source of the previous embodiments altogether, the optical pulse being generated entirely within the SOA 82 and not as a result of gating the separate CW broad bandwidth optical signal. Consequently there also is no longer a requirement for the coupler of the previous embodiments. These modifications reduce the cost of the interrogation system 80, as compared with the previous embodiments, and also save optical power, since there is no longer any power lost through a coupler.

When coupled to an optical waveguide containing one or more reflective optical elements to be interrogated, in this example optical fibre 94 containing an array of gratings G1 to Gn, the SOA 82 is operated in the same manner as described above, the frequency of the electrical drive pulses being set to select which grating within the array is to be interrogated.

Figure 8:
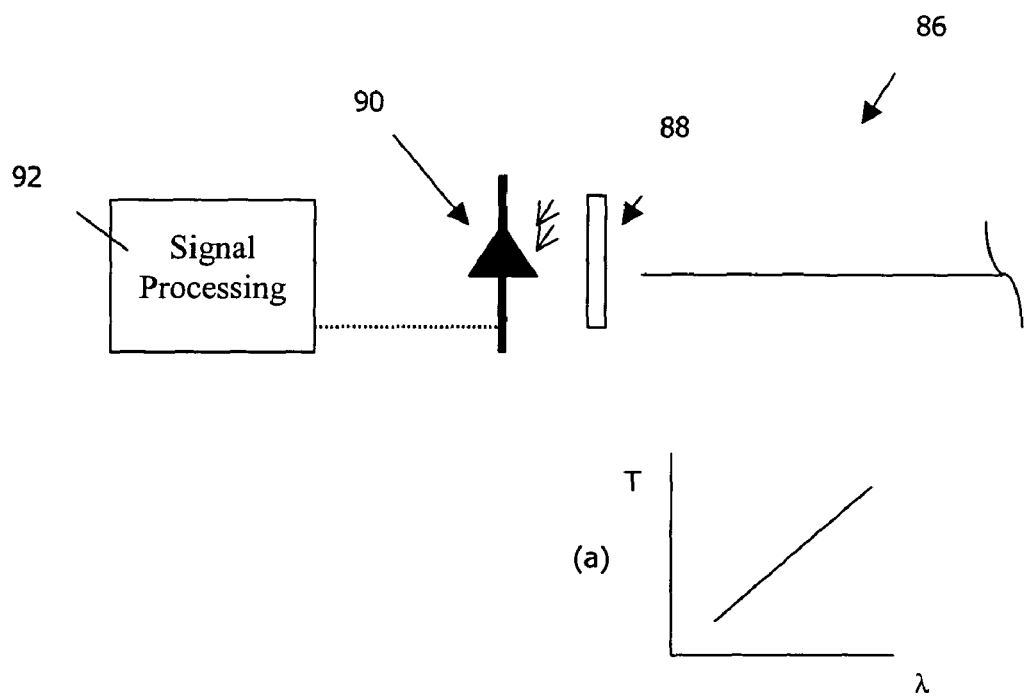
FIG. 8 is a diagrammatic representation of the wavelength evaluation apparatus of FIG. 7.

The wavelength evaluation apparatus 86, shown in FIG. 8, comprises an optical filter element 88 having a wavelength dependent filter response (see inset (a)), followed by optical detection means in the form of a photodetector 90. The electrical output of the photodetector 90 is connected to signal processing means 92 operable to determine the wavelength of a detected optical signal. The optical power of the filtered reflected optical pulse identifies the wavelength of the reflected pulse, and hence the wavelength of the grating being interrogated.

When the interrogation system 80 is coupled to the optical fibre 94 containing an array of gratings G to be interrogated, they together form an optical sensor system 96 according to a twelfth embodiment of the invention. Similarly to the arrays of gratings provided within fibres 16 and 56 of the previous embodiments, the resonant wavelengths of each of the gratings G are substantially the same, each grating G again operating within the same optical channel.

Figure 9:
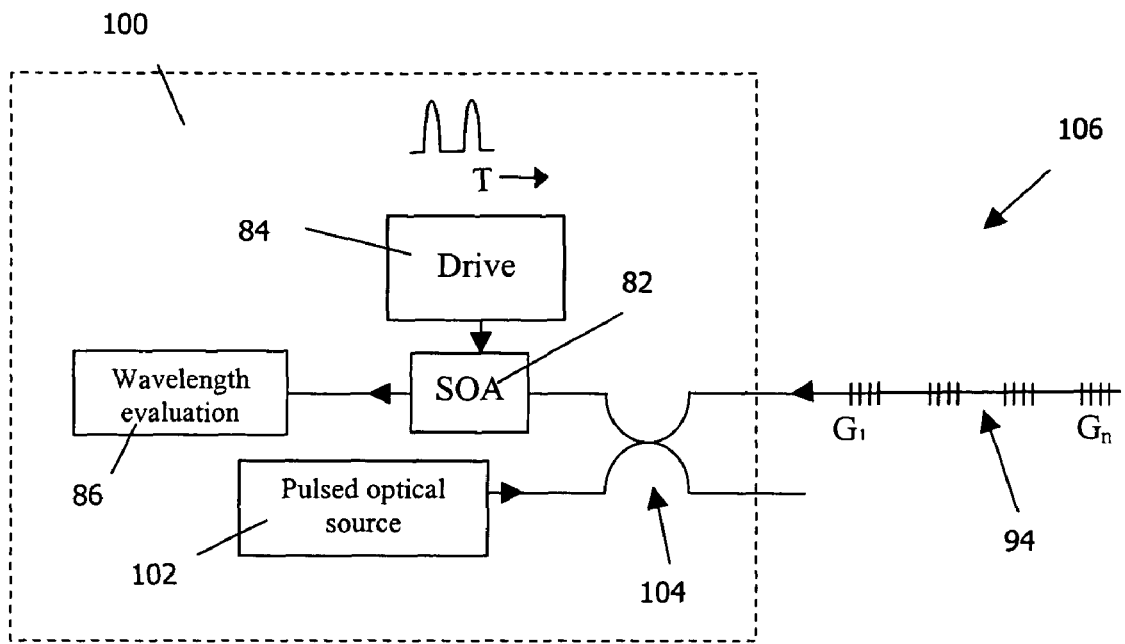
FIG. 9 is a diagrammatic representation of an optical interrogation system according to a thirteenth embodiment of the invention and an optical sensor system according to a fourteenth embodiment of the invention.

The interrogation system 100 of the embodiment shown in FIG. 9 is substantially the same as the interrogation system 80 of the previous embodiment, with the following modifications. The same reference numerals are retained for corresponding features.

In this example, similarly to the interrogation system 40 shown in FIG. 4, the SOA 82 performs only as an optical amplifying and gating device, the broad bandwidth optical pulses being generated by a separate pulsed optical source 102. The pulsed optical source 102 is coupled into the interrogation system 100 after the SOA 82, via an optical coupler 104. This means that when the interrogation system 100 is coupled to an optical fibre 94 containing an array of gratings G to be interrogated, the optical pulses generated by the pulsed optical source 102 are coupled into the optical fibre 94 without passing through the SOA 82, as described above in connection with FIG. 4.

When the interrogation system 100 is coupled to the optical fibre 94 containing an array of gratings G to be interrogated, they together form an optical sensor system 106 according to a fourteenth embodiment of the invention.

Figure 10:
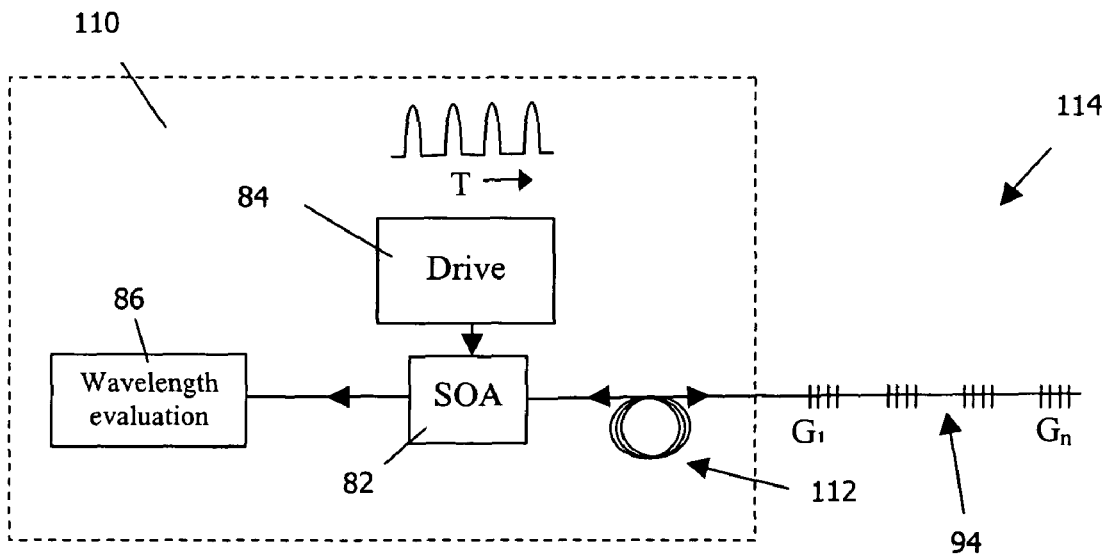
FIG. 10 is a diagrammatic representation of an optical interrogation system according to a fifteenth embodiment of the invention and an optical sensor system according to a sixteenth embodiment of the invention.

FIG. 10 shows an interrogation system 110 according to a fifteenth embodiment of the invention. The interrogation system 110 is substantially the same as the interrogation system 80 of the eleventh embodiment, with the following modification. The same reference numerals are retained for corresponding features.

In this embodiment, similarly to the interrogation systems 30, 40, 50, 70 shown in FIGS. 2, 4, 5, and 6, an additional section of optical waveguide, in this example a length of optical fibre 112, is provided after the SOA 82 i.e. when the interrogation system 110 is coupled to the optical fibre 94 containing gratings G to be interrogated, the additional fibre 112 is located between the SOA 82 and the optical fibre 94. As explained above, this additional length of optical fibre 112 is included to remove the possibility of interference from simultaneous reception at the SOA 82 of reflected optical pulses from more than one grating G, thereby enabling the SOA 82 to be driven by a continuous stream of electrical drive pulses.

When the interrogation system 110 is coupled to the optical fibre 94 containing an array of gratings G to be interrogated an optical sensor system 114 according to a sixteenth embodiment of the invention is formed.

Figure 11:
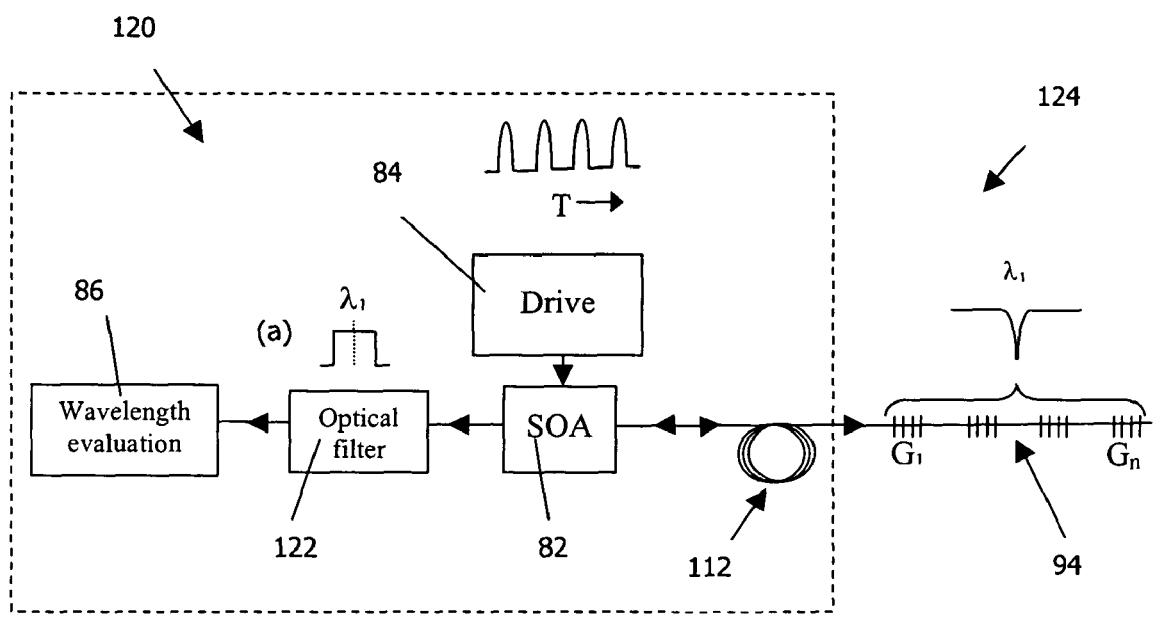
FIG. 11 is a diagrammatic representation of an optical interrogation system according to a seventeenth embodiment of the invention and an optical sensor system according to an eighteenth embodiment of the invention.

An optical interrogation system 120 according to a seventeenth embodiment of the invention is shown in FIG. 11. This interrogation system 120 is substantially the same as the interrogation system 110 shown in FIG. 10, with the following modification. The same reference numerals are retained for corresponding features.

In this example an optical filter 122 is provided between the SOA 82 and the wavelength evaluation apparatus 86. Similarly to the filter 72 present in the ninth embodiment of the invention, the filter 122 has a top-hat filter function (shown in inset (a)) having a spectral range corresponding to the operating range of the reflective optical elements, in this example gratings G, to be interrogated. In its application here, the filter 122 acts to remove broadband background noise (i.e. wavelengths which lie outside the operating range of the gratings G to be interrogated) present on a reflected optical signal transmitted by the SOA 82. The background noise is generated by the SOA 82 and added to a reflected optical signal as it is transmitted (and amplified) by the SOA 82. Removing any such background noise will improve the signal to noise ratio of the reflected optical signal which reaches the wavelength evaluation apparatus 86.

By coupling the interrogation apparatus 120 to an optical fibre 94 containing an array of gratings G to be interrogated an optical sensor system 124 according to an eighteenth embodiment of the invention is provided.

Figure 12:
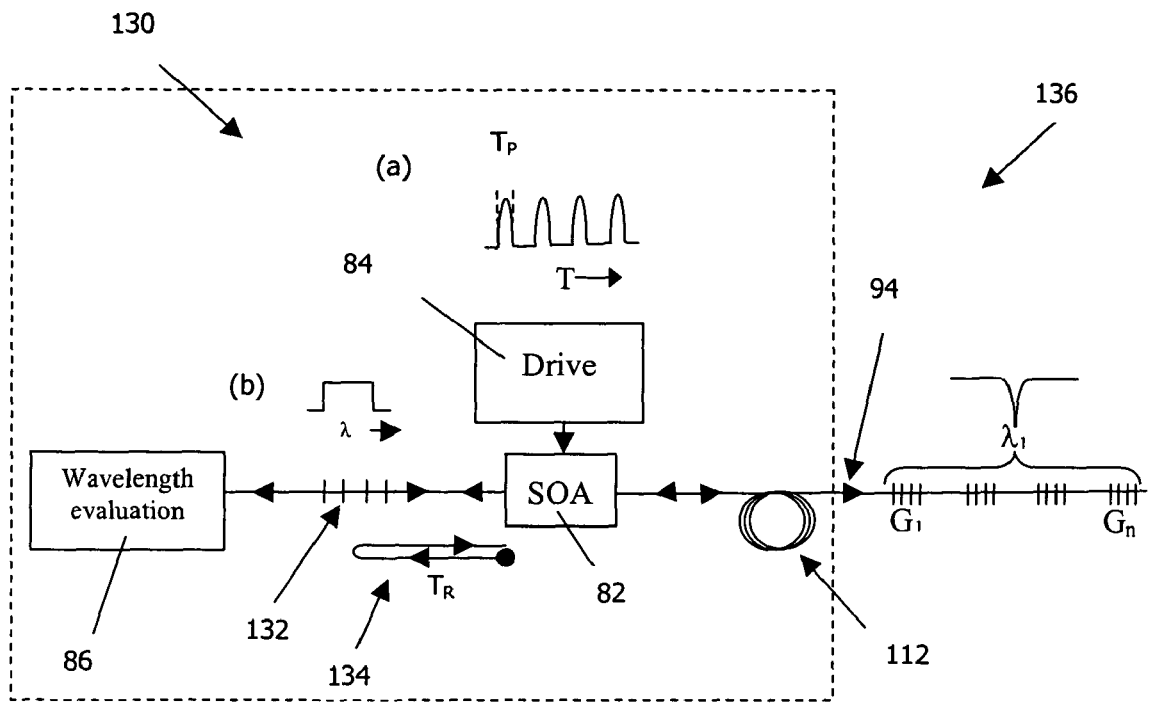
FIG. 12 is a diagrammatic representation of an optical interrogation system according to a nineteenth embodiment of the invention and an optical sensor system according to a twentieth embodiment of the invention.

FIG. 12 shows an optical interrogation system 130 according to a nineteenth embodiment of the invention. The interrogation system 130 of this embodiment is substantially the same as the interrogation system 110 shown in FIG. 10, with the following modification. The same reference numerals are retained for corresponding features.

The interrogation system 130 includes an optical reflector, in the form of a chirped fibre Bragg grating (CFBG) 132 in this example, between the SOA 82 and the wavelength evaluation apparatus 86. The CFBG 132 has a reflectivity of less than 100%, ~99% in this example. The function of the CFBG 132 is to reflect part (~99%) of a reflected optical pulse back towards the SOA 82, and transmit the remainder (~1%) of the reflected optical pulse to the wavelength evaluation apparatus 86.

The choice of optical reflector depends on the operating characteristics required. Some of the design criteria which must be considered when selecting which type of optical reflector to use are as follows:

The use of an optical reflector having a high reflectivity will reduce the number of cycles which a reflected optical pulse must make through the system before it reaches its maximum optical power. The maximum optical power that a pulse can achieve is determined by the losses within the interrogation system 130 and the optical saturation and gain characteristics of the SOA 82. This would be an advantage where the interrogation system 130 is required to have a fast response. In addition, having a highly reflective optical reflector will enable the interrogation system 130 to tolerate a higher level of optical loss within the system. This could mean that an array containing a larger number of reflective optical elements and/or more weakly reflective optical elements could be interrogated.

The use of an optical reflector having a lower reflectivity to that described would result in a higher proportion of the reflected optical signal being delivered to the wavelength evaluation apparatus 86. This can reduce the length of time required to interrogate each reflective optical element, since a higher power optical signal would be delivered to the wavelength evaluation apparatus 86. Having a higher power optical signal would also enable wavelength evaluation apparatus requiring higher optical signal levels to be used.

If the spectral bandwidth of the optical reflector, CFBG 132, only covers the operating range of the reflective optical elements to be interrogated, then only the broadband background noise at wavelength within that spectral range will be reflected back into the SOA 82 for further amplification. This will reduce the output of out-of-band signals from the SOA 82, and concentrate the amplification power on the wavelengths reflected by the reflective optical element under interrogation.

In contrast, using an optical reflector having a spectral bandwidth which covers the full spectral range of the SOA 82 will reduce the amount of out-of-band noise transmitted to the wavelength evaluation apparatus 86. This can improve in the signal to noise ratio at the wavelength evaluation apparatus 86.

The CFBG 132 is located sufficiently close (in terms of fibre length) to the SOA 82 to ensure that the propagation time TR for a reflected optical pulse to travel from the SOA 82 to the CFBG 132 and back to the SOA 82 (as indicated by arrow 134) is shorter than the duration TP of the electrical drive pulses applied to the SOA 82 (see inset (a)).

Figure 13:
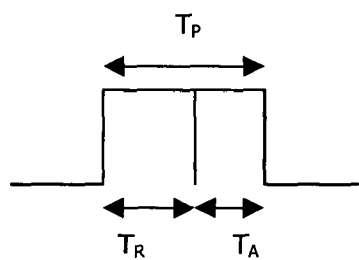
FIG. 13 is a diagrammatic representation of an electrical drive pulse to be applied to the SOA of FIG. 12.

In operation, when the interrogation system 130 is coupled to an optical fibre 94 containing an array of gratings G to be interrogated, a reflected optical pulse transmitted (and amplified) by the SOA 82 meets the back reflecting CFBG 132, part (~1%) of the reflected optical pulse being transmitted to the wavelength evaluation apparatus 86 and the rest (~99%) of the optical pulse being re-reflected back towards the SOA 82. Because the duration of an electrical drive pulse (TP), and thus the period for which the SOA 82 is switched on (also TP), are longer than the pulse propagation time TR, the SOA 82 is still switched on (i.e. the gate is still open) when the re-reflected optical pulse arrives back at the SOA 82. The duration (also TP) of this first re-reflected optical pulse is also longer than the pulse propagation time TR, therefore part of the re-reflected optical pulse, being the portion of the optical pulse which is longer than the pulse propagation time, experiences further amplification as it is again transmitted through the SOA 82. This is illustrated in FIG. 13.

The propagation time TR therefore determines the portion of the reflected optical pulse that is able to under go multiple amplification and reflection (cycling) within the interrogation system 130. Although the SOA 82 will add some broadband background noise to the reflected optical pulse, the re-reflected optical pulse is dominated by the wavelengths reflected by the grating under interrogation. Therefore, although some interference will result if the electrical drive pulse applied to the SOA 82 is longer than twice the time taken by an optical pulse to propagate between closest adjacent gratings within the array being interrogated, the resulting interference is less significant than that experienced by the previously described interrogation systems where the optical pulses do not undergo cyclical amplification. Adjustment can therefore be made to the distance between the CFBG 132 and the SOA 82 to allow the use of a slower operating SOA 82, or lower speed electronics within the drive means 84.

The re-reflected, re-amplified optical pulse which leaves the SOA 82, contains the wavelengths that were originally reflected by the grating being interrogated, plus lower level broadband background noise from the SOA 82. The optical pulse propagates along the optical fibre 94 towards the gratings G, as described earlier. Again a portion of the pulse is reflected from each grating within the array and again a series of reflected optical pulses (separated in time and space) arrive back at the SOA 82. As before, only one reflected optical pulse arrives while the SOA 82 is switched on, since all others will arrive either before or after the electrical drive pulse is applied to the SOA 82. The selected optical pulse is again amplified as it to passes through the SOA 82, and propagates on to the CFBG 132 where the cycle begins once more.

The narrow band of wavelengths that are reflected by the reflective optical element, in this example a fibre grating, being interrogated experience multiple amplifications in a cyclical trip back and forth through the SOA 82. An initial low power broad bandwidth optical pulse generated by the SOA 82 undergoes multiple cycles through the interrogation system 130, and, as a result of the optical amplification it experiences on each pass through the SOA 82, rapidly forms into a strong narrow bandwidth optical pulse. The ultimate optical power that an optical pulse can achieve is dependant on the nature of the losses within the interrogation system 130 and the saturation and gain characteristics of the SOA 82 used.

As described previously, the selection of a particular grating within an array for interrogation is controlled by adjustment of the frequency of the electrical drive pulses applied to the SOA 82. The duration of each pulse is chosen to take into account the effect of the fibre length between the CFBG 132 and the SOA 82.

When the interrogation system 130 is coupled to the fibre 94 containing an array of gratings G to be interrogated, an optical sensor system 136 according to a twentieth embodiment of the invention is formed.

Due to the multiple amplifications experienced by the optical pulses cycling within the interrogation system 130, very strong optical pulses can be generated even when the reflective optical elements, in this example fibre gratings, being interrogated have very low reflectivities. Using low reflectivity gratings means that the optical pulses can pass through many gratings without suffering a significant loss of power at each grating. 3-reflection interference has also being shown to be negligible for low reflectivity gratings. The use of low reflectivity gratings within a sensor array therefore enables many more gratings to be incorporated within the optical sensor system 136, with reduced interference between gratings occurring.

The cyclical operation of the interrogation system 130 and the grating sensor system 136 provides various advantages. Very strong, narrow bandwidth optical pulses can rapidly build up around the resonant wavelength the grating being interrogated. Such a strong and narrowed wavelength optical signal is easier for various types of wavelength evaluation apparatus to measure.

The broad bandwidth background noise generated by an SOA 82 reduces when the SOA 82 is required to amplify a strong narrow bandwidth optical signal. This transfer, or narrowing, of power into the dominant (strongly reflected) wavelengths causes a reduction in the broadband background noise once a reflected optical pulse has undergone a number of cycles within the interrogation system 130, and the dominant (wanted) optical signal has built up. This results in a further increase in the signal to noise ratio.

Figure 14:
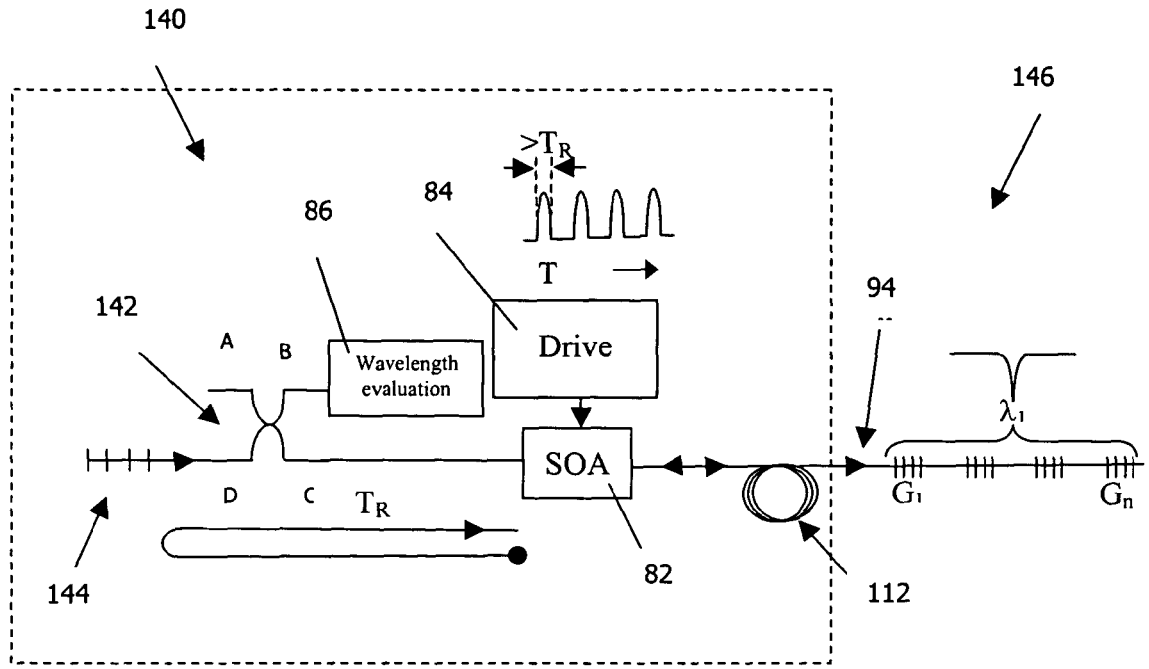
FIG. 14 is a diagrammatic representation of an optical interrogation system according to a twenty-first embodiment of the invention and an optical sensor system according to a twenty-second embodiment of the invention.

FIG. 14 shows an optical interrogation system 140 according to a twenty-first embodiment of the invention. The interrogation system 140 is substantially the same as the interrogation system of the previous embodiment, with the following modifications. The same reference numerals are retained for corresponding features.

In this example the interrogation system further includes an optical routing device in the form of an optical fibre coupler 142. The coupler 142 is located between the CFBG 144 and the SOA 82, the CFBG 144 being coupled to the SOA 82 via ports C and D of the coupler 142. The wavelength evaluation apparatus 86 is coupled to port B of the coupler 142.

This new optical arrangement means that it is the optical signal reflected by the CFBG 144 which is transmitted to the wavelength evaluation apparatus 86. The CFBG 144 can therefore now be made to 100% reflective if required. As discussed above, the spectral range covered by the CFBG 144 can be selected such that it only covers the operating range of the gratings to be interrogated. This means that the optical signal routed to the wavelength evaluation apparatus 86 will only contain wavelengths located within the spectral range of the CFBG 144. Consequently, the only SOA-generated noise seen by the wavelength evaluation apparatus will be that which lies within the spectral range of the CFBG 144 (and thus the operating range of the gratings G). All the optical signals at wavelengths falling outside this spectral range will not be reflected by the CFBG 144, and will therefore not reach the wavelength evaluation apparatus 86. This will lead to an increase in the signal to noise ratio at the wavelength evaluation apparatus 86.

Additionally, since the spectral profile of the CFBG 144 only covers the operating spectral range of the gratings to be interrogated, the presence of the CFBG 144 will reduce the out-of-band signal amplified by the SOA 82, thereby improving its efficiency.

In order to include the coupler 142 in the interrogation system 140, the minimum separation distance between the SOA 82 and the CFBG 144 must be increased. Consequently, the duration of the electrical drive pulses to the SOA 82 must also be increased. The presence of the coupler 142 will result in an increase in the optical loss within the interrogation system 140. The amount of loss (through port A) is determined by the coupling ratio (50:50, 60:40 etc) of the selected coupler. Choosing a lower coupling ratio will cause a lower loss, but will provide a lower optical signal level to the wavelength evaluation apparatus 86. However, the increased gain within the interrogation system 140 produced by using a higher reflectivity CFBG 144, and the lower out-of-band noise experienced by the SOA 82, can be used to offset some of the loss incurred by the coupler 142.

When the interrogation system 140 is coupled to the fibre 94 containing an array of gratings G to be interrogated, they together form an optical sensor system 146 according to a twenty-second embodiment of the invention.

Figure 15:
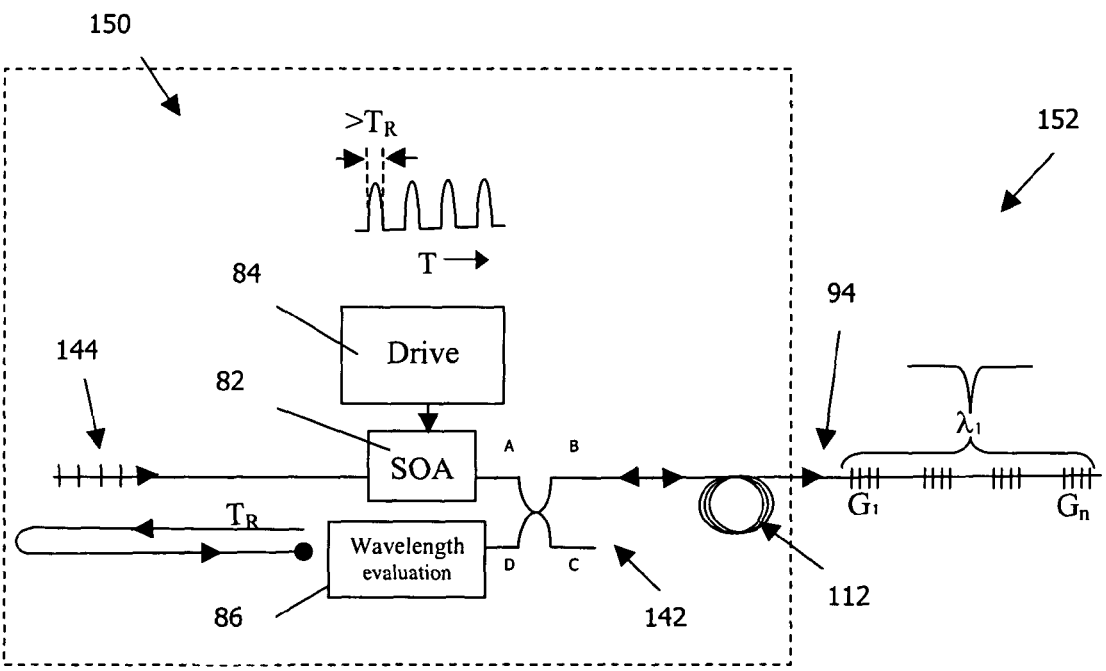
FIG. 15 is a diagrammatic representation of an optical interrogation system according to a twenty-third embodiment of the invention and an optical sensor system according to a twenty-fourth embodiment of the invention.

An optical interrogation system according to a twenty-third embodiment of the invention is shown in FIG. 15. This embodiment is substantially the same as the previous embodiment, with the following modification. The same reference numerals are retained for corresponding features.

In this example, the coupler 142 is positioned on the other side of the SOA 82, being coupled, via ports A and B, between the SOA 82 and the additional fibre 112. As a result, the wavelength evaluation apparatus 86 receives reflected optical pulses directly from grating being interrogated, without the pulses first passing through the SOA 82. This means that the reflected optical pulses received by the wavelength evaluation apparatus 86 do not contain any out-of-band noise from the SOA 82. The signal-to-noise ratio of the optical pulses transmitted to the wavelength evaluation apparatus 86 is therefore improved.

When the interrogation system 150 is coupled to the optical fibre 94 containing an array of gratings to be interrogated, they together form an optical sensor system 152 according to a twenty-fourth embodiment of the invention.

Figure 16:
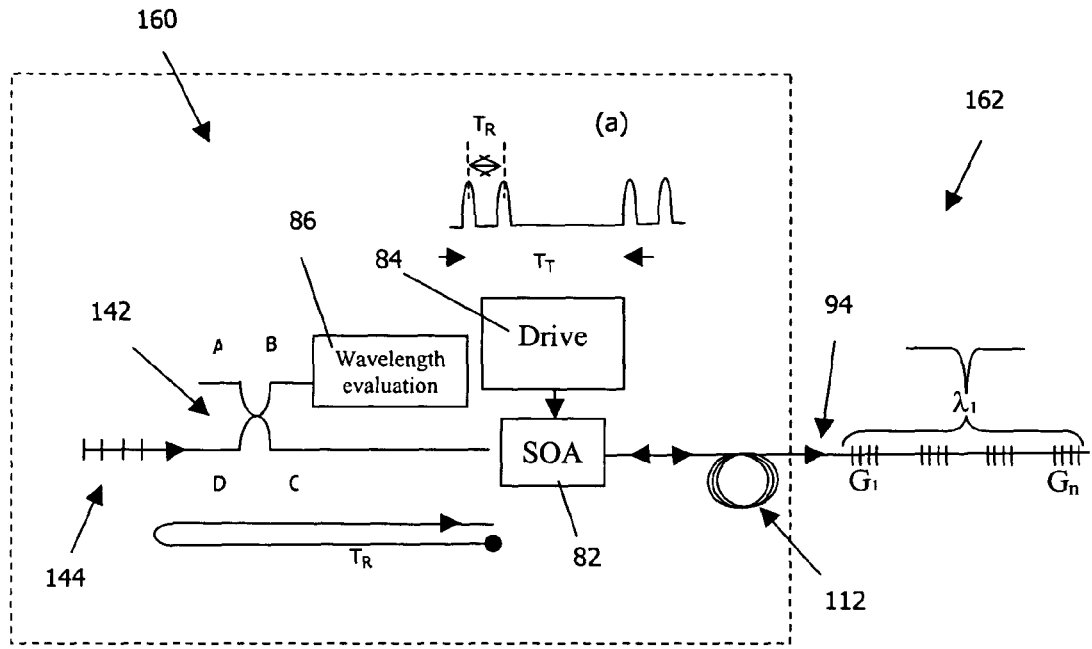
FIG. 16 is a diagrammatic representation of an optical interrogation system according to a twenty-fifth embodiment of the invention and an optical sensor system according to a twenty-sixth embodiment of the invention.

FIG. 16 shows an optical waveguide interrogation system 160 according to a twenty-fifth embodiment of the invention which is substantially the same as the interrogation system 140 shown in FIG. 14, with the following modification. The same reference numerals are retained for corresponding features.

Not all of the increased electrical drive pulse duration required by the interrogation system 140 (FIG. 14), due to the presence of the coupler 142, contributes to the amplification of the cycling reflected optical signal. The leading part of the electrical drive pulse will cause a reflected optical signal arriving from a grating being interrogated to be amplified as it passes through the open SOA 82. The trailing part of the electrical drive pulse will cause the re-reflected optical pulse, returned from the CFBG 144, to be further amplified as it passes back through the SOA 82 towards the gratings G. The central part of the electrical drive pulse serves no useful purpose, because during this part of the electrical drive pulse the reflected optical pulse is propagating between the SOA 82 and the CFBG 144. Consequently, any electrical drive signal applied to the SOA 82 at this time will generate unwanted noise. The result is that the extended electrical drive pulses serve only to reduce the electrical efficiency of the SOA 82, and degrade the signal to noise ratio of the interrogation system 140.

These inefficiencies can be overcome by using a stream of pairs electrical drive pulses, as shown in FIG. 16, inset (a). The total path length between the SOA 82 and the CFBG 144, via the coupler, then becomes is less critical (in this example it would typically be a couple of meters).

The duration of each electrical drive pulse is set to be shorter than twice the time taken for an optical pulse to propagate between closest adjacent gratings G within the array of gratings to be interrogated, as described above. The total repetition period (TT) for a complete cycle of pulse pairs is equal to twice the time required for a reflected optical pulse to propagate from the grating under interrogation to the CFBG 144, as described above. The period (TR) between the two pulses within each pair is set to be equal to the time required for a reflected optical pulse to propagate from the SOA 82 to the CFBG 144, and back to the SOA 82.

Therefore, instead of having a single broad electrical drive pulse, where the central region serves no useful purpose, the central region is effectively removed, leaving is two short electrical drive pulses. The first electrical drive pulse in each pair serves to switch the SOA 82 on as a reflected optical pulse arrives from a grating being interrogated, thereby transmitting and amplifying the reflected optical pulse. The second electrical drive pulse acts to switch the SOA 82 on again as the re-reflected optical pulse arrives back from the CFBG 144, thereby transmitting (and amplifying) the optical pulse back to the grating being interrogated.

Coupling the interrogation system 160 to the optical fibre 94 containing an array of gratings G to be interrogated forms an optical sensor system 162 according to a twenty-sixth embodiment of the invention.

Figure 17:
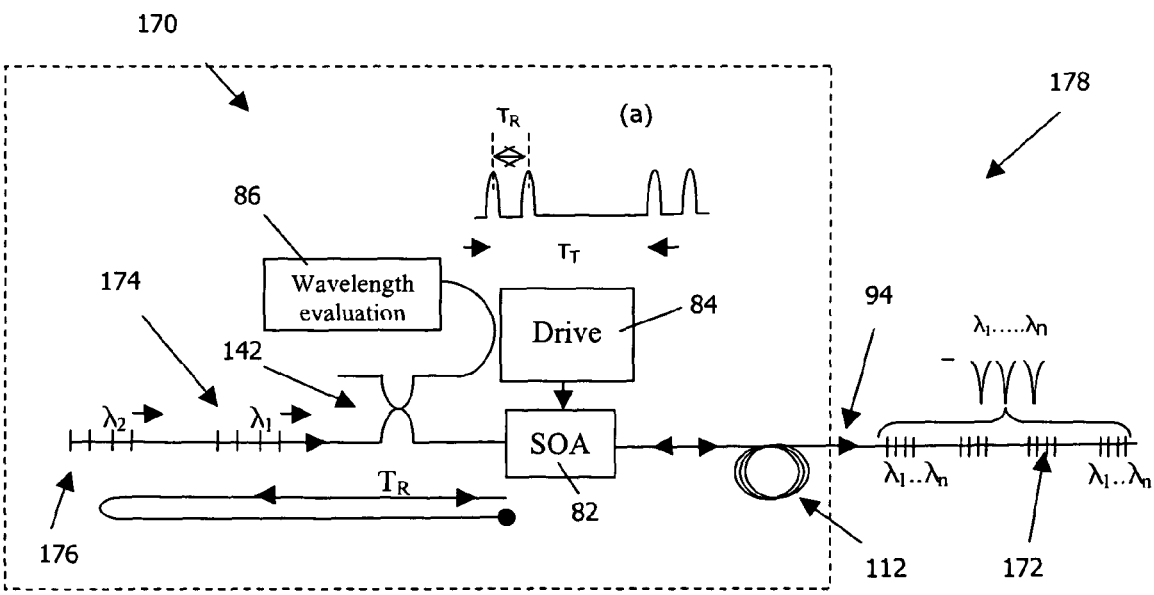
FIG. 17 is a diagrammatic representation of an optical interrogation system according to a twenty-seventh embodiment of the invention and an optical sensor system according to a twenty-eighth embodiment of the invention.

An optical interrogation system 170 according to a twenty-seventh embodiment of the invention is shown in FIG. 17. This interrogation system 170 is substantially the same as the interrogation system 160 shown in FIG. 16, with the following modifications. The same reference numerals are retained for corresponding features.

Where one reflective optical element is shown in previous embodiments at a particular position within an array of reflective optical elements to be interrogated, it is actually possible to position a group of reflective optical element, in this example gratings 172. Each grating 172 within the group operates within a different wavelength window. The interrogation system 170 of this embodiment is intended for interrogating such an array of groups of gratings. Since the resonant wavelength of each grating within a group 172 lies within a different wavelength window, each grating therefore operates within a different optical channel. For example, each group 172 may contain seven FBGs, suitable resonant wavelengths within the C-band being 1530 nm, 1535 nm, 1540 nm, 1545 nm, 1550 nm, 1555 nm and 1560 nm, making each optical channel 5 nm wide. In this example, the gratings each have a length of 2.5 nm, a bandwidth of 0.2 nm and a transmission loss of 4%. The gratings within each group 172 are required to be separated by a distance which is shorter than the propagation distance covered an optical signal during half of an electrical drive pulse, and in this example are separated by 10 cm.

Each group 172 contains the same number of gratings, of the same set of resonant wavelengths. Equivalent gratings in adjacent groups 172 are separated by 1 m: for example, the 1540 nm grating within one group is separated from the 1540 nm grating in the adjacent group or groups by 1 m.

The result of having the gratings to be interrogated arranged in such groups 172, is that, during operation, for each broad bandwidth optical pulse generated by the SOA 82, multiple reflected optical pulses (the reflections from each grating within a group 172) arrive back at the SOA 82 at approximately the same time. Therefore, the first electrical drive pulse in each pair applied to the SOA 82 will cause the SOA 82 to transmit all of the reflected optical pulses corresponding to a particular group of gratings 172.

In order to separate the multiple reflected optical pulses transmitted by the SOA 82, the single CFBG 144 optical reflector of the previous embodiment is replaced with a series of optical reflectors, in the form of an array (only the first two are shown in FIG. 17 for clarity) of FBGs 174, 176. Each FBG 174, 176 reflects wavelengths within a different spectral range, each spectral range corresponding to the wavelength window covered by one of the optical channels in which the gratings to be interrogated operate. In this example the bandwidth of each of the FBG reflectors 174, 176, and thus of the optical channels, is 5 nm.

Each FBG reflector 174, 176 is positioned at a different distance from the SOA 82. In this example, adjacent FBG reflectors 174, 176 are separated by 1 m. As a result, the time of flight of a reflected optical pulse from the SOA 82 to its respective FBG reflector 174, 176 and back to the SOA 82 will be dependent upon which grating within the group 172 the optical pulse was reflected from.

Therefore, as before, adjustment of the period TR between the electrical drive pulses within a pair and the period TT between pairs of pulses, will allow a particular grating, within a particular group 172, to be selected for interrogation.

By coupling the interrogation system 170 to the fibre 94 containing the groups 172 of gratings to be interrogated, an optical sensor system 178 according to a twenty-eighth embodiment of the invention is formed.

In operation, the second electrical drive pulse in the first pair will cause the SOA 82 to generate an optical pulse, which propagates towards the gratings to be interrogated. Part of the optical pulse will be reflected by each grating, giving rise to a series of reflected optical pulses, each having a peak wavelength corresponding to its respective grating. The reflected optical signals from the gratings within a particular group 172 will arrive back at the SOA 82 at approximately the same time, corresponding to the application of the first electrical drive pulse in the following electrical drive pulse pair to the SOA 82. This group of reflected optical signals are therefore transmitted and amplified by the SOA 82, from where they continue onwards to the array of FBG reflectors 174, 176.

Since each FBG reflector 174, 176 covers a different optical channel, each of the reflected optical signals will be re-reflected from a different FBG reflector 174, 176. The re-reflected optical signals will therefore propagate back towards the SOA 82 separated in time and space. Only one of the re-reflected optical pulses will arrive at the SOA 82 while the SOA 82 is switched on by the second electrical drive pulse in the second pair of electrical drive pulses. All of the other re-reflected optical signals will arrive at the SOA 82 while it is off and will therefore be blocked from further cycling within the sensor system 178.

The selected optical pulse is transmitted and amplified by the SOA 82 and propagates once again towards the gratings, where it is again reflected by the grating selected for interrogation, and the cycle repeats.

Although both of the electrical drive pulses in a pair cause an optical pulse to be generated, due to the cycling nature of the system, only one group 172 of gratings is able to undergo cyclical amplification and reach a peak. Therefore any potential interference from other groups of gratings can be neglected.

The interrogation system 170 and the sensor system 178 provide the following advantages. Only one reflected optical signal is presented to the wavelength evaluation apparatus 86. This increases the range of possible wavelength evaluation techniques that may be employed. In particular it allows the use of a colorless, repeated function, wavelength evaluation apparatus that is able to operate over a range of wavelength windows. For example, the optical filter described above, having a wavelength dependent transmission function, may be replaced by a Fabry-Perot filter or an etalon slope filter, both of which can be fabricated in optical fibre to reduce optical loss.

In addition, since only one reflected optical pulse is supported by the sensor system at any one time, all of the optical amplification power of the SOA 82 can be concentrated into this single optical pulse. The optical power of the SOA 82 does not have to be shared between a number of reflected optical signals and there is therefore no possibility of instability or power conflict between optical channels.

Figure 18:
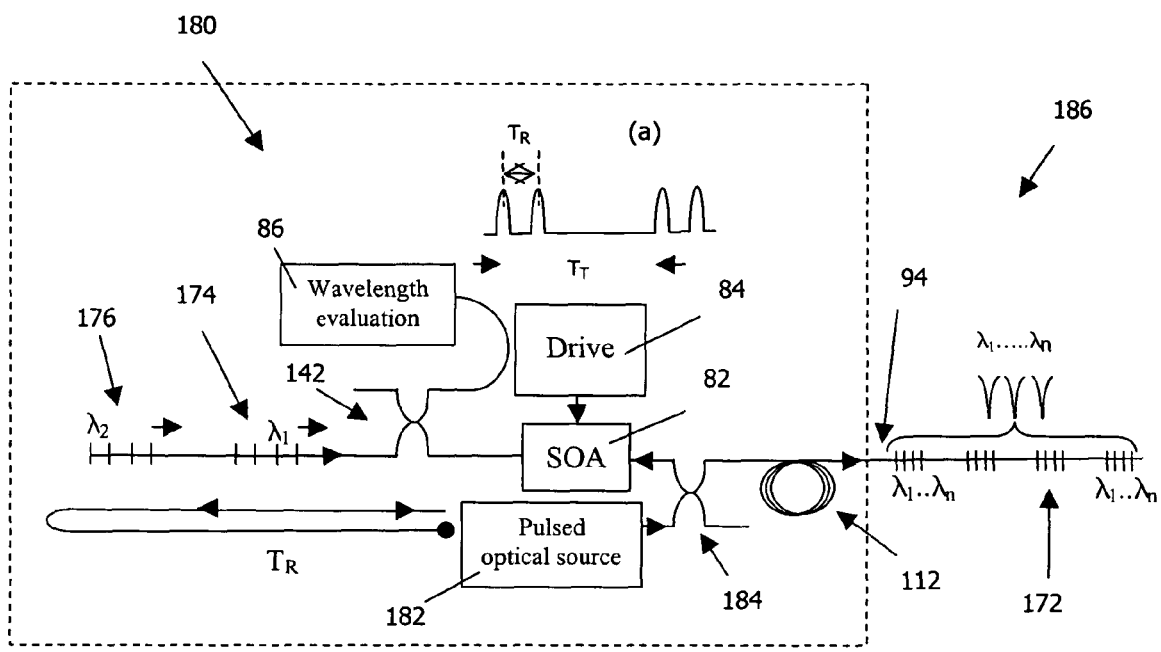
FIG. 18 is a diagrammatic representation of an optical interrogation system according to a twenty-ninth embodiment of the invention and an optical sensor system according to a thirtieth embodiment of the invention.

FIG. 18 shows an optical interrogation system 180 according to a twenty-ninth embodiment of the invention. The interrogation system 180 is substantially the same as the interrogation system 170 of FIG. 17, with the following modification. The same reference numerals are retained for corresponding features.

In this embodiment the optical pulses are generated by a pulsed optical source 182, the SOA 82 being restricted to acting as an optical amplifying and gating device. In order to avoid the need for complicated timing arrangements to make the SOA 82 gate selectively couple optical pulses from pulsed optical source 182 into the optical fibre 94, the pulsed optical source is coupled via a fibre coupler 184 to the optical fibre 94 between the SOA 82 and the additional length of fibre 112.

By coupling the interrogation system 180 to an optical fibre 94 containing an array of groups 172 of gratings to be interrogated, an optical sensor system 186 according to a thirtieth embodiment of the invention is formed.

Figure 19:
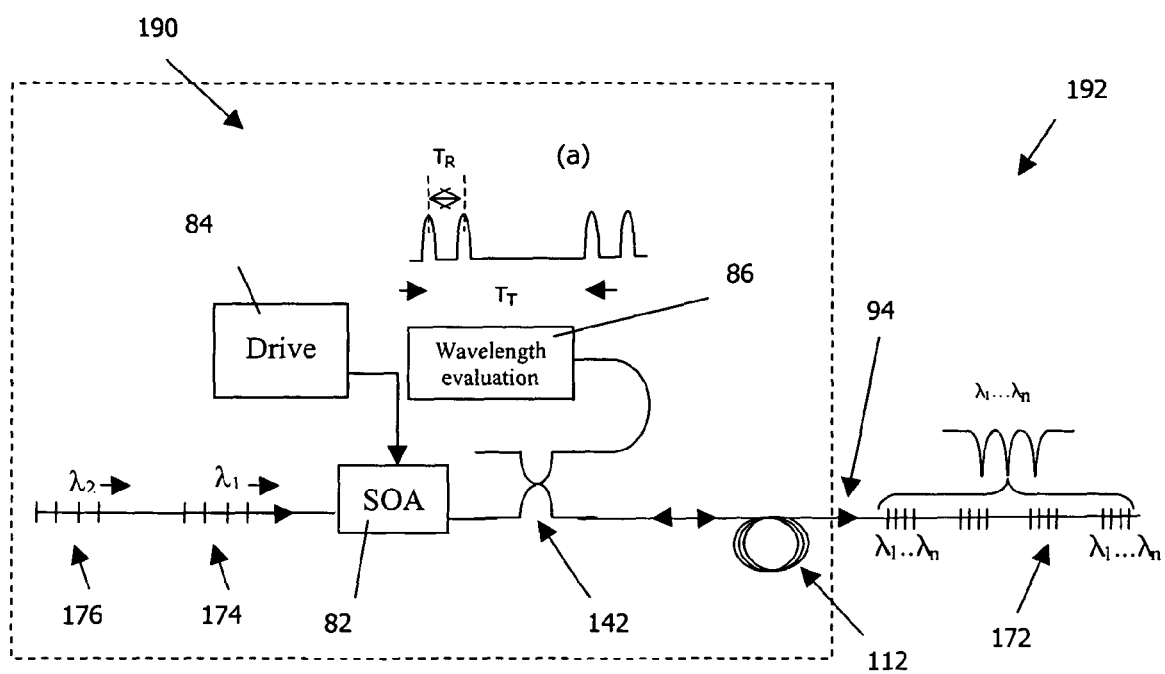
FIG. 19 is a diagrammatic representation of an optical interrogation system according to a thirty-first embodiment of the invention and an optical sensor system according to a thirty-second embodiment of the invention.

An optical waveguide interrogation system 190 according to a thirty-first embodiment of the invention is shown in FIG. 19. This interrogation system 190 is substantially the same as the interrogation system 170 shown in FIG. 17, with the following modification. The same reference numerals are retained for corresponding features.

In this example the coupler 142 and the wavelength evaluation apparatus 86 are moved to the grating array side of the SOA 82. As described above in connection with FIG. 17, only one of the optical pulses reflected from the FBG reflectors 174, 176 will arrive back at the SOA 82 while the SOA 82 is switched on. All of the other re-reflected optical signals will arrive at the SOA 82 while it is off and will therefore be blocked from further transmission. Locating the wavelength evaluation apparatus 86 on this side of the SOA 82 therefore has the advantage of increasing the selectivity of the desired reflected optical signal and removing other wavelengths from the optical signal presented to the wavelength evaluation apparatus 86.

Coupling the interrogation system 190 to the fibre 94 containing an array of gratings to be interrogated forms an optical sensor system 192 according to a thirty-second embodiment of the invention.

Figure 20:
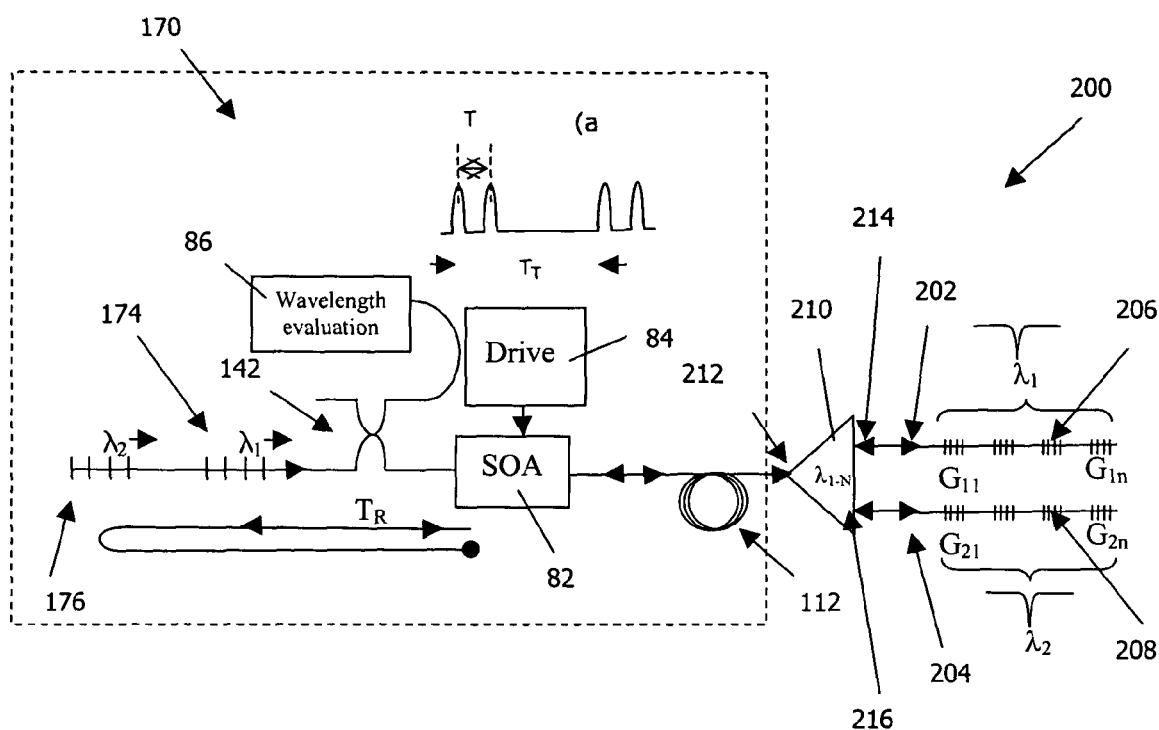
FIG. 20 is a diagrammatic representation of an optical sensor system according to a thirty-third embodiment of the invention.

An optical sensor system 200 according to a thirty-third embodiment of the invention is shown in FIG. 20. The sensor system 200 makes use of an optical interrogation system 170 as shown in FIG. 17, although an optical interrogation system 180 as shown in FIG. 18 or 190 as shown in FIG. 19 may alternatively be used.

In this example the sensor system 200 also comprises two fibres 202, 204 containing arrays of sensor gratings 206, 208 respectively. The fibres 202, 204 are coupled to the interrogation system 170 via a WDM multiplexer-de-multiplexer (MUX-DEMUX) 210. In operation, a MUX-DEMUX 210 de-multiplexes a combined optical signal containing many optical channels presented at the single port 212 on one side into a plurality of optical signals (one for each optical channel). Each of the de-multiplexed optical signals is output through a different one of the output ports on the opposite side of the MUX-DEMUX. Each output port supports a different optical channel. The MUX-DEMUX 210 also operates in reverse to multiplex a plurality of optical signals into a single combined optical signal. In this example only two of the output ports 214, 216 are used, since there are only two optical channels in use.

Each of the gratings 206, 208 within an array has the same resonant wavelength, i.e. all of the gratings 206, 208 within an array operate within the same optical channel. The optical channel in which the gratings 206, 208 in a particular fibre 202, 204 operate corresponds with the optical channel supported by the output port 214, 216 of the MUX-DEMUX 210 to which that fibre 202, 204 is coupled.

As described above, the interrogation system 170 is operable to differentiate gratings both spatially and by wavelength channel. It is therefore possible to individually interrogate any of the gratings 206, 208 within two fibres 202, 204.

Although only two fibres 202, 204 containing arrays of gratings 206, 208 to be interrogated are shown connected to the output ports of the MUX-DEMUX 210, it will be appreciated that a greater number of fibres, and thus arrays of gratings, may be provided. The number of different grating arrays that can be supported is limited only by the number of wavelength channels which can be interrogated by the interrogator 170 and the configuration of the MUX-DEMUX 210.

The use of the WDM MUX-DEMUX 210 to couple multiple arrays of gratings 206, 208 to a single interrogator 170 reduces the optical loss present within the sensor system 200, as compared to using a coupler (as shown in FIG. 5). The ability to having a large number of arrays of gratings within a single sensor system 200 is an advantage in sensing applications where measurements must be made in relatively widely spaced locations.

Figure 21:
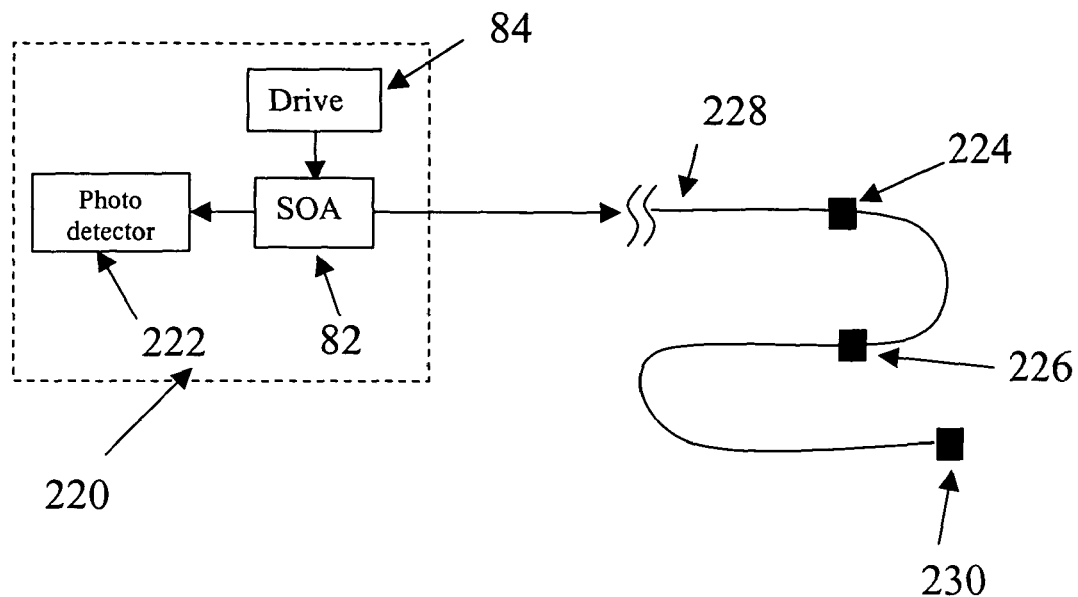
FIG. 21 is a diagrammatic representation of an optical interrogation system according to a thirty-fourth embodiment of the invention.

An optical interrogation system 220 according to a thirty-fourth embodiment of the invention is shown in FIG. 21. The optical interrogation system 220 of this embodiment is substantially the same as the optical interrogation system 80 shown in FIG. 7, with the following modification. The same reference numbers are retained for corresponding features.

In this embodiment, the optical detection means takes the form of a photodetector 222.

The optical interrogation system 220 is operable as an optical time domain reflectometer (OTDR). As shown in FIG. 21, the OTDR 220 can be used to interrogate, for example, reflective optical elements in the form of breaks 224 or patchcord connections 226 within an optical fibre 228, or the end 230 of the optical fibre 228.

Figure 22:
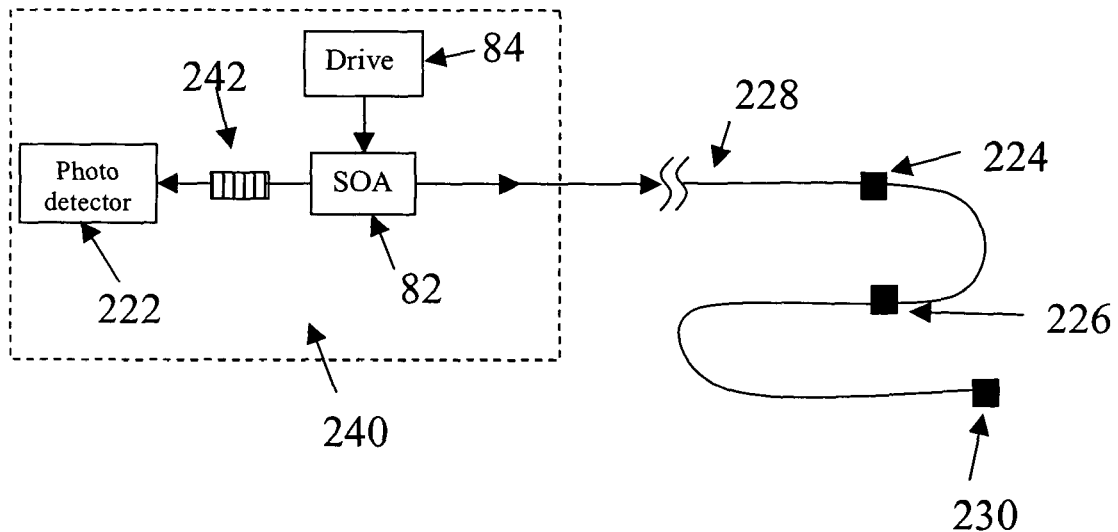
FIG. 22 is a diagrammatic representation of an optical interrogation system according to a thirty-fifth embodiment of the invention.

FIG. 22 shows an optical interrogation system 240 according to a thirty-fifth embodiment of the invention. The optical interrogation system 240 is substantially the same as the system 220 of the previous embodiment, with the following modification. The same reference numbers are retained for corresponding features.

In this embodiment, the optical interrogation system 240 further comprises optical signal routing means in the form of a fibre Bragg grating (FBG) 242 provided in the optical path of a returned optical signal, between the SOA 82 and the photodetector 222. The FBG 242 has a reflectivity of less than 100% so that the majority of a returned optical sign is reflected by the FBG 242, while part of the returned optical signal is transmitted to the photodetector 222. As described above in connection with FIG. 12, the reflected part of the returned optical signal passes back through the SOA 82 and propagates back towards a reflective optical element under investigation. The optical interrogation system 240 is operable as an OTDR.

Figure 23:
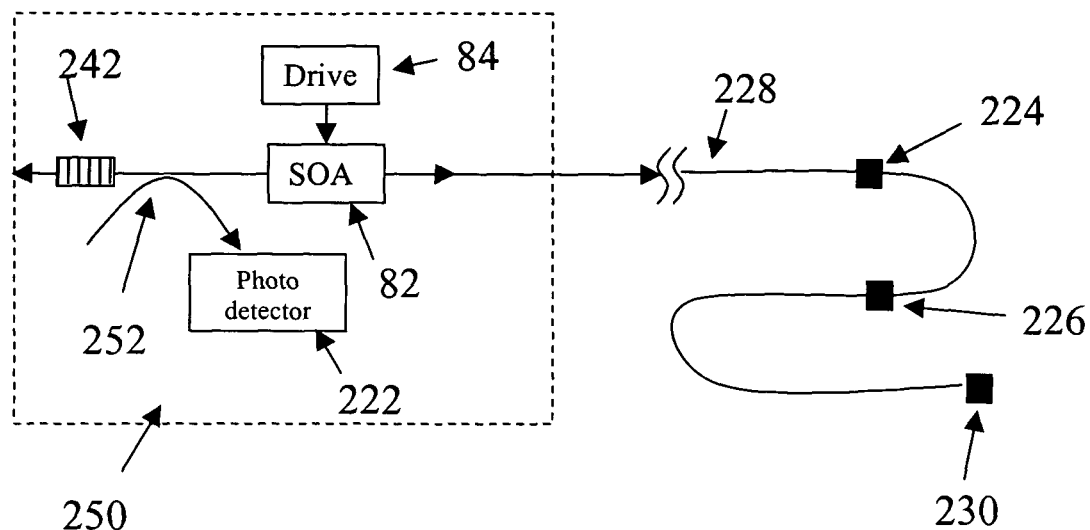
FIG. 23 is a diagrammatic representation of an optical interrogation system according to a thirty-sixth embodiment of the invention.

An optical interrogation system 250 according to a thirty-sixth embodiment of the invention is shown in FIG. 23. This optical interrogation system 250 is substantially the same as the interrogation system 240 of the previous embodiment, with the following modification. The same reference numerals are retained for corresponding features.

In this embodiment, the photodetector 222 is located on the opposite side of the FBG 242, between the FBG 242 and the SOA 82. The photodetector 222 is coupled into the optical interrogation system 250 using a low percentage optical coupler 252. This arrangement has the advantage that only the part of the returned optical signal reflected by the FBG 242 is routed to the photodetector 222. Any amplified spontaneous emission (ASE) noise generated by the SOA 82 outside the reflection bandwidth of the FBG 242 is transmitted and thereby removed.

Figure 24:
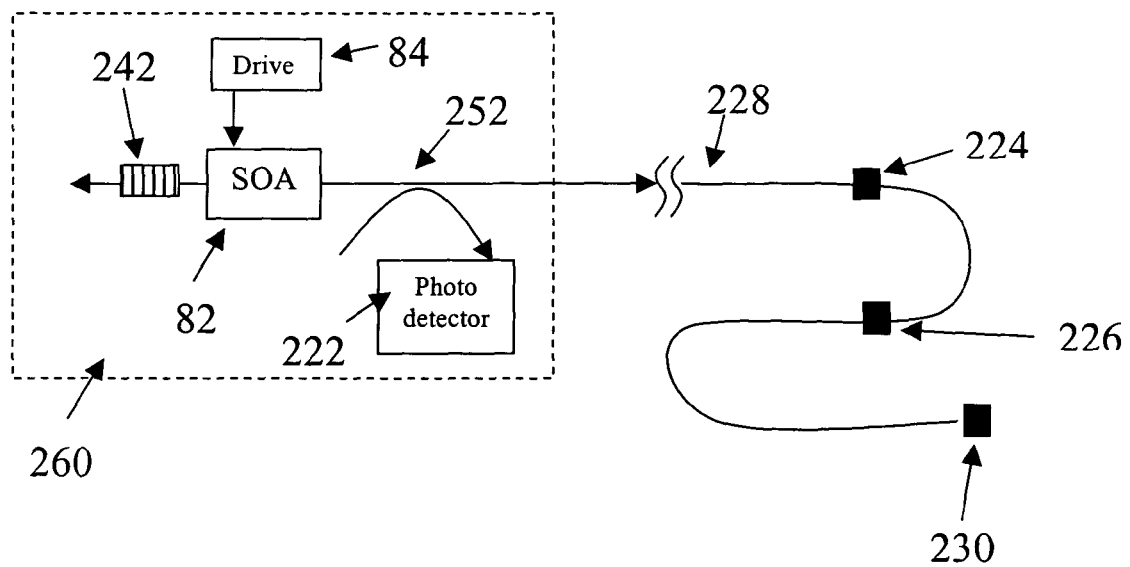
FIG. 24 is a diagrammatic representation of an optical interrogation system according to a thirty-seventh embodiment of the invention.

An optical interrogation system 260 according to a thirty-seventh embodiment of the invention is shown in FIG. 24. This optical interrogation system 260 is substantially the same as the system 250 according to the previous embodiment, with the following modification.

In this embodiment, the photodetector 222 located on the other side of the SOA 82, being coupled into the system 260 via the optical coupler 252. This arrangement provides the advantage that the reflected part of the returned optical signal has been further amplified by the SOA 82 before being passed to the photodetector 222.

Figure 25:
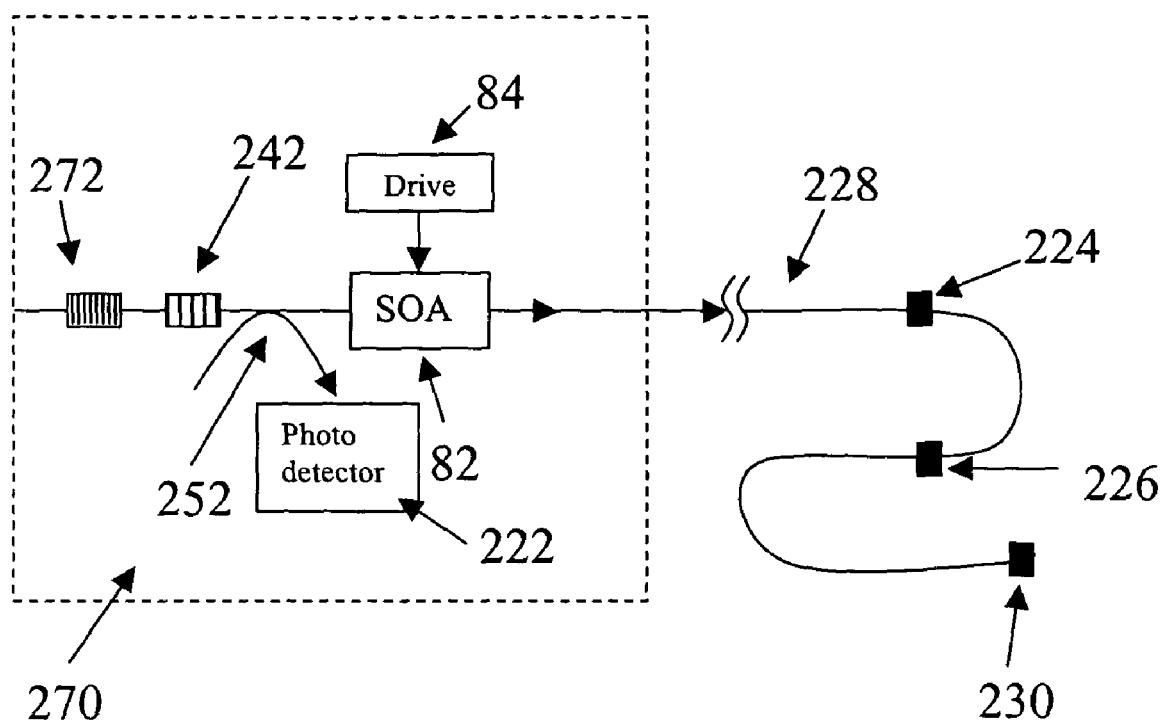
FIG. 25 is a diagrammatic representation of an optical interrogation system according to a thirty-eighth embodiment of the invention.

An optical interrogation system 270 according to a thirty-eighth embodiment of the invention is shown in FIG. 25. The optical interrogation system 270 according to this embodiment is substantially the same as the system 250 shown in FIG. 23, with the following modifications.

In this embodiment, a second optical signal routing means in the form of a second FBG 272 is provided adjacent to the first FBG 242. The two FBGs 242, 272 have different resonant wavelengths. Similarly to the optical interrogation system 170 shown in FIG. 17, the drive means 84 generates pairs of drive pulses. The first drive pulse in each pair causes an optical signal pulse to be generated and launched into the optical fibre 228 containing reflective optical elements to be interrogated. The first drive pulse also gates returned optical signals, selecting which one will be transmitted to the FBGS 242, 272. The transmitted returned optical signal is reflected by one of the FBGs 242, 272, depending upon its wavelength. The separation between the first drive pulse and the second drive pulse selects which of the FBGs 242, 272 is in use, thereby selecting the operating wavelength bandwidth.

This arrangement is advantageous for an optical system which includes reflective optical elements that have wavelength dependent reflective properties. This enables, for example, fibre breaks (which will affect all wavelengths) to be distinguished from wavelength drift of specific reflective optical elements, which will not generally affect all wavelengths.

The described embodiments provide various advantages, as follows. Using the SOA simultaneously as a broadband source and a combined optical gate and amplifier means that the interrogation systems can be constructed with a single active optical component, or one active component for each separate array of reflective optical elements to be interrogated. This reduces the overall size and cost of the interrogation systems, and provides improved efficiency and reliability, as compared to many known existing systems. In the described optical sensor systems which use a time division multiplexed based interrogation system, all of the gratings can be identical which simplifies both manufacturing and installation procedures. The gratings may alternatively be replaced by a different type of reflective optical element, each element again being identical.

The provision of an additional length of optical fibre between the SOA and an array of reflective optical elements to be interrogated enables the SOA to be driven by a continuous stream of electrical drive pulses, and, where the SOA forms part of the optical pulse source, permits arrays of reflective optical elements to be interrogated using a continuous stream of optical pulses. This results in the interrogation systems having improved efficiency as compared to a basic known TDM based interrogation systems. Incorporating one or more FBG back reflectors in the interrogation systems and allowing the optical pulses to cycle in the sensor systems provides various advantages. Low reflectivity reflective optical elements, such as low reflectivity FBGs, can be used within the optical sensor systems. Low reflectivity FBGs are cheaper to make, suffer less from 3-reflection interference and allow a greater number of gratings to be used within an array before power levels fall to unacceptable levels than high reflectivity gratings. Cycling the optical pulses also means that high signal-to-noise ratios (SNRs) are achieved because the power of the SOA is focused into the dominant cycling wavelength, causing the broad band ASE noise generated by the SOA to reduce. Cycling pulses are also more tolerant of slower electrical and optical response times (for a given SNR) than would be expected for non-cycling pulses. This means that the reflective optical elements within an optical sensor system can have a smaller separation between them than is possible when non-cycling pulses are used.

By using pairs of electrical drive pulses, the SNR of an interrogation system and a sensor system can be increased yet further, and the electrical efficiency is improved. In addition, adjustment of the electrical drive pulse timing allows active selection of which reflected optical signal, and thus which reflective optical element, is to be interrogated by selecting which FBG back reflector is the correct distance from the SOA to allow re-reflected signals to be re-transmitted by the SOA.

The use multiple back reflectors enables interrogation systems to use both WDM and TDM. This can be used to further reduce the spacing between reflective optical elements to be interrogated, to thereby increase the total number of reflective optical elements within an optical sensor system, or to allow a sensor system to incorporate multiple separate arrays of reflective optical elements.

When the interrogation system uses both TDM and WDM the interrogation system is able to output a single optical signal at a time, which allows the use of a greater range of wavelength interrogation techniques at the wavelength evaluation apparatus.

Various modifications may be made to the described embodiments without departing from the scope of the invention. In particular, the skilled person will appreciate that different types of reflective optical elements may be used in place of the fibre gratings, fibre breaks and patchcord connectors described. A reflective optical element may be any one of the following: a Fabry-Perot etalon device, which may be a bulk optic Fabry-Perot etalon; an optical fibre Fabry-Perot etalon; an optical waveguide grating based Fabry-Perot etalon; an end of an optical fibre, which may be a mirrored end; the end of an optical fibre patch-cord; a break within a section of optical fibre; a crystal based reflective optical element; or a mirror element.

The three different broad bandwidth optical pulse sources described, namely the CW broad bandwidth optical source plus the SOA, the SOA on its own, and the pulsed optical source, may be used interchangeably. The SLD described may be replaced by any other suitable CW broad bandwidth optical source. As the skilled person will appreciate, the selection of the optical source will at least in part depend upon the wavelength range of the reflective optical elements to be interrogated, since the optical source must be operable to generate an optical signal including those wavelengths.

Where the reflective optical elements to be interrogated are described as gratings, a different number of gratings may be used, and the gratings may have different resonant wavelengths, to those described. The gratings within an array may also be separated by a different distance to that described.

Each interrogation system may be used to interrogate more than one array of reflective optical elements, such as the gratings shown in FIG. 5, and therefore each sensor system may include more than one array of reflective optical elements.

Where fibre Bragg gratings are described planar Bragg gratings may alternatively be used, and Bragg gratings may be replaced by other types of optical waveguide gratings. As the skilled person will appreciate, if planar optical waveguide gratings are used, the optical fibres described would be replaced by planar optical waveguides. This would enable an entire interrogation system to be fabricated as a hybrid planar light-wave circuit that incorporated the SOA, drive electronics and optical devices such as the optical filters and back reflectors, and optical couplers or circulators The SOAs described may be replaced by other optical amplifying and gating means capable of pulsed operation. In particular, a gain clamped SOA may alternatively be used.

The wavelength evaluation apparatus described, namely the wavemeter and the optical filter plus photodetector, may be used interchangeably. The optical filter having a wavelength dependent transmission function may be a bulk optic device, or may be an optical waveguide grating device, such as a tilted Bragg grating (as described in our co-pending UK patent application GB 0013411.4 and PCT application PCT/GB01/02422).

The optical filters provided within or following the optical pulse sources may have a different spectral transmission profile to that described. Similarly, the optical filters provided in front of the wavelength evaluation apparatus may have a different spectral transmission profile to that described. The CFBG back reflectors described may have different spectral profiles to those described, and may be replaced by different optical reflectors, in particular different optical fibre gratings or different planar optical waveguide gratings. Where more than one back reflector is used a different number of back reflectors may be used to that described and there may be a different separation between adjacent back reflectors.

The invention claimed is:

1. An optical interrogation system comprising:
    an optical source operable to generate optical pulses, to be coupled into one end of an optical waveguide, the waveguide being optically coupled at its other end to one or more reflective optical elements to be interrogated;
    optical amplifying and gating means to be optically coupled to the waveguide and being operable to selectively transmit an optical pulse returned from a reflective optical element under interrogation,
    and being further operable to optically amplify an optical signal transmitted therethrough; and
    optical detection means optically coupled to the optical amplifying and gating means, and being operable to detect the returned optical pulse transmitted by the optical amplifying and gating means.

2. An interrogation system as claimed in claim 1, wherein the optical amplifying and gating means is an optical amplifying device capable of switched operation, such that, when switched on, the optical amplifying and gating means transmits and amplifies an optical signal, and when switched off the transmission and amplification of optical signals is prevented.

3. An interrogation system as claimed in claim 1, wherein the optical amplifying and gating means is bi-directionally operable, and comprises a device selected from the group consisting of a semiconductor optical amplifier and a gain clamped semiconductor optical amplifier.

4. An interrogation system as claimed in claim 1, wherein the interrogation system further comprises drive apparatus for the optical amplifying and gating means, the drive apparatus being operable to generate electrical drive pulses of variable frequency and, to cause the optical amplifying and gating means to switch on and off.

5. An interrogation system as claimed in claim 1, wherein the optical source comprises the optical amplifying and gating means, wherein when the optical amplifying and gating means is switched on it simultaneously generates an optical signal, in the form of amplified spontaneous emission, and gates the optical signal into an optical pulse.

6. An interrogation system as claimed in claim 1, wherein the optical source comprises a continuous wave optical source operable to generate a continuous wave optical signal, such as a super-luminescent optical diode, coupled to the optical amplifying and gating means, wherein as the optical amplifying and gating means is switched on and off it gates the continuous wave optical signal into optical pulses.

7. An interrogation system as claimed in claim 1, wherein the optical source comprises a pulsed optical source operable to generate optical pulses.

8. An interrogation system as claimed claim 1, wherein the optical detection means comprises a photodetector.

9. An interrogation system as claimed in claim 1, wherein the optical detection means comprises wavelength evaluation apparatus, such as a wavemeter, an optical spectrum analyser or an optical filter element having a wavelength dependent filter response followed by optical detection means, such as a photodetector; the time of flight of the optical signal identifying which grating it was returned from and the wavemeter, optical spectrum analyser or optical filter and optical detection means measuring the wavelength of the optical signal.

10. An interrogation system as claimed in claim 1, wherein the interrogation system further comprises a section of optical waveguide coupled between the optical amplifying and gating means and the optical waveguide containing reflective optical elements to be interrogated.

11. An interrogation system as claimed in claim 1, wherein the interrogation system further comprises optical signal routing means configured to route an optical pulse returned from a reflective optical element being interrogated back through the optical amplifying and gating means, in the direction towards the reflective optical element under interrogation.

12. An interrogation system as claimed in claim 11, wherein the optical signal routing means comprises an optical reflector provided after the optical amplifying and gating means, the spectral profile in reflection of the optical reflector covering the same spectral range as tat occupied by the one or more reflective optical elements to be interrogated, and the reflector being located sufficiently close to the optical amplifying and gating means to ensure that the time it takes an optical signal to propagate from the optical amplifying and gating means to the reflector and back to the optical amplifying and gating means is shorter than the duration of the electrical drive pulse switching the optical amplifying and gating means on.

13. An interrogation system as claimed in claim 12, wherein a series of optical reflectors are provided after the optical amplifying and gating means, each reflector being located at a different distance from the optical amplifying and gating means, the most distant reflector being located sufficiently close to the optical amplifying and gating means to ensure that the time it takes an optical signal to propagate from the optical amplifying and gating means to the most distant reflector and back to the optical amplifying and gating means is shorter than the duration of the electrical drive pulse switching the optical amplifying and gating means on.

14. An interrogation system as claimed in claim 13, wherein the spectral profile in reflection of each optical reflector covers a different spectral range.

15. An optical sensor system comprising:
an optical waveguide coupled at one end to one or more reflective optical elements;
the optical waveguide being coupled at its other end to an optical interrogation system as claimed claim 1.

16. An optical sensor system as claimed in claim 15, wherein the optical sensor system comprises an optical waveguide coupled to a spaced array of optical waveguide gratings.

17. A sensor system as claimed in claim 16, wherein the resonant wavelength of each grating within the array lies within the same wavelength window, all of the gratings thereby operating within a single optical channel.

18. A sensor system as claimed in claim 17, wherein the gratings within the array are arranged in groups, each group containing a substantially identical set of gratings, the resonant wavelength of each grating within a group lying within a different wavelength window, and thus operating within a different optical channel, such that the time of flight of a returned optical pulse identifies which group a grating being interrogated belongs to.

19. A sensor system as claimed in claim 15, wherein the or each reflective optical element comprises: a Fabry-Perot etalon device, which may be a bulk optic Fabry-Perot etalon; an optical fibre Fabry-Perot etalon; an optical waveguide grating based Fabry-Perot etalon; an end of an optical fibre, which may be a mirrored end; the end of an optical fibre patch-cord; a break within a section of optical fibre; a crystal based reflective optical element; or a mirror element.

20. A sensor system as claimed in claim 15, wherein the sensor system comprises a plurality of optical waveguides each coupled at one end to one or more reflective optical elements, each waveguide being coupled to a respective optical amplifying and gating means.

* * * * *